United States Patent
Stabile et al.

(10) Patent No.: US 8,015,456 B2
(45) Date of Patent: Sep. 6, 2011

(54) NETWORK FAULT MANAGER FOR MAINTAINING ALARM CONDITIONS

(75) Inventors: Lawrence A. Stabile, Cochituate, MA (US); Mark W. Sylor, Nashua, NH (US); Thomas Allen LaRosa, Tyngsboro, MA (US); Bradley S. Carey, Wrentham, MA (US); David William Russo, Princeton, MA (US); Kevin M. Jackson, Hopkinton, MA (US); Albert Briner, Hollis, NH (US); Jeremiah David Small, Marlborough, MA (US); Matthew Eric Baddeley, Holden, MA (US)

(73) Assignee: Computer Associates Think, Inc., Islandia, NY (US)

( * ) Notice: Subject to any disclaimer, the term of this patent is extended or adjusted under 35 U.S.C. 154(b) by 237 days.

(21) Appl. No.: 12/246,218

(22) Filed: Oct. 6, 2008

(65) Prior Publication Data

US 2009/0070640 A1 Mar. 12, 2009

Related U.S. Application Data

(62) Division of application No. 10/670,692, filed on Sep. 25, 2003, now Pat. No. 7,434,109.

(60) Provisional application No. 60/415,402, filed on Oct. 2, 2002, provisional application No. 60/413,908, filed on Sep. 26, 2002.

(51) Int. Cl.
*G06F 11/00* (2006.01)
(52) U.S. Cl. .......................................... 714/57; 715/736
(58) Field of Classification Search .................... 714/57; 715/736
See application file for complete search history.

(56) References Cited

U.S. PATENT DOCUMENTS

| | | | | |
|---|---|---|---|---|
| 5,418,950 A | * | 5/1995 | Li et al. | 715/781 |
| 5,774,377 A | | 6/1998 | Eidson et al. | 702/187 |
| 5,850,388 A | * | 12/1998 | Anderson et al. | 370/252 |
| 5,949,759 A | | 9/1999 | Cretegny et al. | 370/250 |
| 6,253,339 B1 | | 6/2001 | Tse et al. | 714/47 |
| 6,604,208 B1 | | 8/2003 | Gosselin et al. | 714/4 |
| 6,966,015 B2 | | 11/2005 | Steinberg et al. | 714/47 |
| 7,043,661 B2 | | 5/2006 | Valadarsky et al. | 714/4 |
| 7,076,695 B2 | * | 7/2006 | McGee et al. | 714/47 |
| 7,120,819 B1 | | 10/2006 | Gurer et al. | 714/4 |
| 7,143,153 B1 | * | 11/2006 | Black et al. | 709/223 |
| 7,434,109 B1 | | 10/2008 | Stabile et al. | 714/47 |
| 2002/0012011 A1 | * | 1/2002 | Roytman et al. | 345/736 |
| 2002/0049838 A1 | | 4/2002 | Sylor et al. | 709/224 |
| 2004/0024869 A1 | * | 2/2004 | Davies | 709/224 |
| 2005/0081156 A1 | * | 4/2005 | Clark et al. | 715/736 |

* cited by examiner

*Primary Examiner* — Yolanda L Wilson
(74) *Attorney, Agent, or Firm* — Pillsbury Winthrop Shaw Pittman LLP

(57) ABSTRACT

The network fault manager described herein may generate an alarm data table having various columns and rows respectively corresponding to different alarm data fields and different alarms. The alarm data table may be associated with a primary key that includes a subset of the different data fields in the multiple columns to uniquely represent the different alarms in the multiple rows. In response to removing one or more of the different alarm data fields in the subset from the primary key, the primary key may non-uniquely represent the different alarms in a plurality of the multiple rows. Thus, the alarm data table may be collapsed to combine the different alarms non-uniquely represented in the plurality of the multiple rows into one combined row uniquely representing the different alarms, whereby the collapsed alarm data table may replace the plurality of the multiple rows with the combined row.

15 Claims, 12 Drawing Sheets

| ELEMENT | COMPONENT | PROFILE | GROUP | ALARMTYPE | STARTTIME | ENDTIME | ... | COUNT |
|---|---|---|---|---|---|---|---|---|
| ROUTER1 | INTERFACE1 | X | Y | 1 | 12:00 | 1:00 | ... | 5 |
| ROUTER1 | INTERFACE2 | X | Y | 1 | 12:00 | 1:00 | ... | 3 |
| ROUTER1 | INTERFACE3 | X | Y | 1 | 12:00 | 2:00 | ... | 1 |
| ROUTER2 | INTERFACE1 | X | Y | 1 | 12:00 | 1:00 | ... | 6 |

| ELEMENT | COMPONENT | PROFILE | GROUP | ALARMTYPE | STARTTIME | ENDTIME | ... | COUNT |
|---|---|---|---|---|---|---|---|---|
| ROUTER1 | * | X | Y | 1 | 12:00 | 1:00 | ... | 8 |
| ROUTER1 | * | X | Y | 1 | 12:00 | 2:00 | ... | 1 |
| ROUTER2 | * | X | Y | 1 | 12:00 | 1:00 | ... | 6 |

FIG. 4A

Matching expression 24d

Trap translation file 24

Classification section, 24a
```
acceptExpr =   trapGenericType = enterpriseSpecific &
               trapSpecificType = frDLCIStatusChange &
               frCircuitState = invalid
```

Element mapping section, 24b
```
ipAddress = trapIpAddress
```

Information extraction section, 24c
```
eventName      = "DlciInvalid"
eventDescription = "A Frame Relay circuit DLCI has become invalid"
eventType      = "DlciStatusChange"
matchKey       = format ("$(1):$(2):$(3):$(4)", trapSpecificType,
trapEnterprise, frCircuitIndex, frCircuitDlci)
component      = format ("Interface $(1) DLCI $(2)", frCircuitIndex,
frCircuitDlci)
userMessage    = format ("DLCI $(1) on link $(2) is not reachable",
frCircuitDlci, frCircuitIndex)
eventCarrier   = "Trap: frDLCIStatusChange"
trapSense      = set
```

FIG. 4B

```
TrapRule FrameRelayLinkDown
{
  acceptExpr = trapGenericType = enterpriseSpecific &
               trapSpecificType = frDLCIStatusChange &
               frCircuitState = invalid
  eventName = "DlciInvalid"
  eventDescription = "A Frame Relay circuit DLCI has become invalid"
  eventType = "DlciStatusChange"
  ipAddress = trapIpAddress
  matchKey = format ("$(1):$(2):$(3):$(4)",
                     trapSpecificType, trapEnterprise,
                     frCircuitIndex, frCircuitDlci)
  component = format ("Interface $(1) DLCI $(2)",
                      frCircuitIndex, frCircuitDlci)
  userMessage = format ("DLCI $(1) on link $(2) is not reachable",
                        frCircuitDlci, frCircuitIndex)
  eventCarrier = "Trap: frDLCIStatusChange"
  trapSense = set
}
```

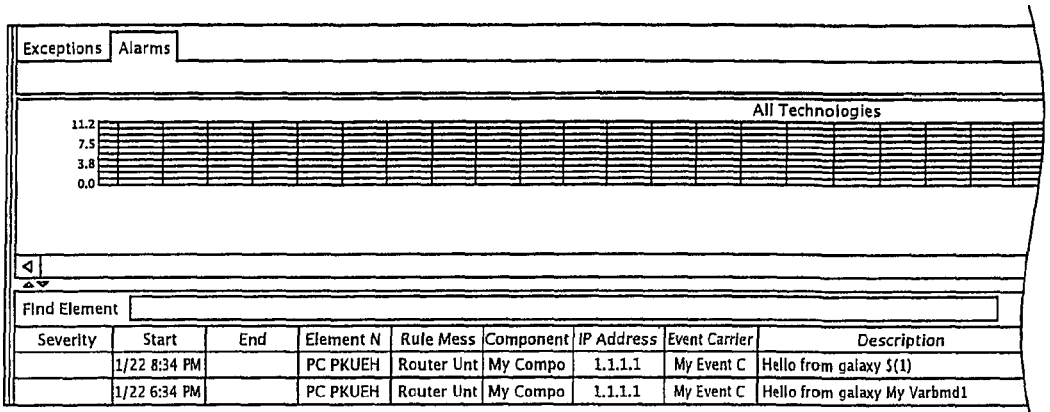

FIG. 12

| ELEMENT | COMPONENT | PROFILE | GROUP | ALARMTYPE | STARTTIME | ENDTIME | ... | COUNT |
|---|---|---|---|---|---|---|---|---|
| ROUTER1 | INTERFACE1 | X | Y | 1 | 12:00 | 1:00 | ... | 5 |
| ROUTER1 | INTERFACE2 | X | Y | 1 | 12:00 | 1:00 | ... | 3 |
| ROUTER1 | INTERFACE3 | X | Y | 1 | 12:00 | 2:00 | ... | 1 |
| ROUTER2 | INTERFACE1 | X | Y | 1 | 12:00 | 1:00 | ... | 6 |

FIG. 13A

| ELEMENT | COMPONENT | PROFILE | GROUP | ALARMTYPE | STARTTIME | ENDTIME | ... | COUNT |
|---|---|---|---|---|---|---|---|---|
| ROUTER1 | * | X | Y | 1 | 12:00 | 1:00 | ... | 8 |
| ROUTER1 | * | X | Y | 1 | 12:00 | 2:00 | ... | 1 |
| ROUTER2 | * | X | Y | 1 | 12:00 | 1:00 | ... | 6 |

FIG. 13B

| ELEMENT | COMPONENT | PROFILE | GROUP | ALARMTYPE | STARTTIME | ENDTIME | ... | COUNT |
|---|---|---|---|---|---|---|---|---|
| ROUTER1 | * | X | Y | 1 | 12:00 | * | ... | 9 |
| ROUTER2 | * | X | Y | 1 | 12:00 | * | ... | 6 |

FIG. 13C

| ELEMENT | COMPONENT | PROFILE | GROUP | ALARMTYPE | STARTTIME | ENDTIME | ... | COUNT |
|---|---|---|---|---|---|---|---|---|
| SYSTEM1 | ORACLE | X | Y | XACTION RATE | 12:00 | 1:00 | ... | 4 |
| SYSTEM2 | ORACLE | X | Y | ERROR | 12:00 | 1:00 | ... | 6 |
| SYSTEM3 | ORACLE | X | Y | ERROR | 12:00 | 1:00 | ... | 2 |
| SYSTEM4 | ORACLE | X | Y | ERROR | 12:00 | 1:00 | ... | 3 |

FIG. 14A

| ELEMENT | COMPONENT | PROFILE | GROUP | ALARMTYPE | STARTTIME | ENDTIME | ... | COUNT |
|---|---|---|---|---|---|---|---|---|
| * | ORACLE | X | Y | XACTION RATE | 12:00 | 1:00 | ... | 4 |
| * | ORACLE | X | Y | ERROR | 12:00 | 1:00 | ... | 11 |

FIG. 14B

NETWORK FAULT MANAGER FOR MAINTAINING ALARM CONDITIONS

This application is a divisional of U.S. patent application Ser. No. 10/670,692, entitled "Network Fault Manager for Maintaining Alarm Conditions," filed Sep. 25, 2003, which issued as U.S. Pat. No. 7,434,109 on Oct. 7, 2008, and which claims the benefit of U.S. Provisional Patent Application Ser. No. 60/413,908, entitled "Network Fault Manager," filed Sep. 26, 2002 and U.S. Provisional Patent Application Ser. No. 60/415,402, entitled "Optimization of Predicate Evaluation in a Trap Rule System," filed Oct. 2, 2002. The contents of the above-referenced U.S. patent application and the above-referenced U.S. Provisional Patent Applications are hereby incorporated by reference in their entirety.

TECHNICAL FIELD

This invention relates to management of communications networks, and more particularly to automated network management systems.

BACKGROUND

In network management, an event is something that happens about which a manager (network, system, or application manager) needs to know. A notification is a method by which information about an event is passed to the manager. A notification is an unsolicited message, for example, one that is delivered to a server from an agent that is monitoring a networked device. The notification typically carries information that human network administrators have designated as useful, such as descriptions of a problem, an unusual condition, or an important change of state (for instance, a successful reboot). Network devices are often configured to monitor their environments for such conditions and to report them to a server automatically.

SNMP (Simple Network Management Protocol) defines traps as a type of notification. A trap is sent using the UDP network protocol. Routers, switches, and devices running monitoring agents are examples of network entities that send traps to a NMS.

SNMP versions 1 and 2 (or v1 and v2) have different definitions for traps. Version 1 defines a trap PDU (protocol data unit, which is the collection of data transmitted as a single message) to have a generic trap type, a specific trap type, an enterprise value, and a collection (possibly empty) of variable bindings. Generic trap type includes enumerated values such as coldStart(0), warmStart(1), linkDown(2), linkUp(3), authenticationFailure(4), egpNeighborLoss(5), and enterpriseSpecific(6). Specific trap type gives a type number for enterprise-specific traps. Enterprise is an OID (object identifier) specifying the vendor that defined the specific trap. Variable bindings are use-specific OID/value pairs. SNMP v1 includes a syntax for defining variable bindings.

SNMP version 2 defines a trap PDU to have a notification OID and a collection of variable bindings. The notification OID provides in a single property information that the SNMP v1 provided in the fields for generic-type, specific-type, and enterprise. SNMP v2 variable bindings have conventional structures for the first two bindings. The first binding is sysUpTime, which indicates how long the described system has been operating. The second binding is snmpTrapOid (identification), which identifies the particular PDU. Any additional SNMP v2 variable bindings are use-specific.

Each trap has its own particular definition within the scope laid out by SNMP. The definition is provided in a MIB (management information base) document. A v1 or v2 trap PDU includes information that identifies its defining MIB.

Temporal duplication occurs in the stream of traps arriving at a given server when multiple traps in the stream are carrying substantially the same information (for example, describing the same network condition) at roughly the same time.

SUMMARY

In general, in one aspect, the invention features a computer-implemented method for detecting alarm conditions. The method involves receiving a first trigger event notification for a monitored occurrence on a network; asserting a first alarm condition to represent the first trigger event notification; receiving a next trigger notification after the first trigger event notification, the next trigger event notification also for the monitored occurrence; determining whether the next trigger event notification occurred within a predetermined amount of time after the first trigger event notification; if the next trigger event notification occurred within a predetermined time after the first trigger event notification, maintaining the first alarm condition; and if the next trigger event notification occurred more than the predetermined amount of time after the first trigger event notification, asserting a second alarm condition to represent the next trigger event notification.

Other embodiments include one or more of the following features. The method also involves establishing a redundancy window which specifies the predetermined amount of time; if the next trigger event notification occurs more than the predetermined amount of time after the first trigger event notification, detecting that the redundancy window has elapsed without an occurrence of a subsequent trigger event notification; and upon detecting that the redundancy window has elapsed without the occurrence of a subsequent trigger event notification, clearing the first alarm condition. The step of maintaining the first alarm condition involves restarting the redundancy window based on when the next trigger event notification was received. The first trigger event notification and the next trigger event notification are traps.

In general, in another aspect, the invention features another computer-implemented method for detecting alarm conditions. This other method involves periodically sampling the rate at which similar trigger event notifications arrive, wherein the trigger event notifications are for monitored occurrences on a network; comparing the sampled rate to a first threshold; periodically computing N, wherein N is the number of sampled rates within a preceding window of time that exceed the first threshold; each time N is computed, performing the operations of: (a) comparing N to a second threshold; (b) if N is greater than the second threshold and if a preexisting alarm condition does not exist, asserting a first alarm condition; and (c) if N is greater than the second threshold and if the preexisting alarm condition does exist, maintaining the preexisting alarm condition for a predetermined future period of time.

Other embodiments include one or more of the following features. The operations further include: if N is not greater than the second threshold and if a preexisting alarm condition does exist and if the predetermined amount of time has elapsed since the immediately preceding last time that N exceeded the second threshold, clearing the preexisting alarm condition. The trigger event notifications are traps. The first threshold may be zero or a number greater than zero. The second threshold varies as a function of time (e.g. the second threshold based on past performance of a parameter that is represented by the trigger event notification).

In general, in still another aspect, the invention features another computer-implemented method for detecting alarm conditions. The method involves periodically sampling the rate Ri at which similar trigger event notifications arrive, wherein the trigger event notifications are for monitored occurrences on a network, and wherein Ri is the sampled rate at time i; comparing the sampled rate Ri to a first threshold; for each sampled rate Ri that exceeds the first threshold, computing an amount Mi by which the sampled rate Ri exceeds said first threshold; periodically computing Ti which is a sum of Mi for all sample times i within a preceding window of time; for each Ti that is computed, performing the operations of: (a) comparing Ti to a second threshold; (b) if Ti is greater than the second threshold and if a preexisting alarm condition does not exist, asserting a first alarm condition; and (c) if Ti is greater than the second threshold and if the preexisting alarm condition does exist, maintaining the preexisting alarm condition for a predetermined future period of time.

Other embodiments include one or more of the following features. The operations further include: if Ti is not greater than the second threshold and if a preexisting alarm condition does exist and if the predetermined amount of time has elapsed since the immediately preceding last time that Ti exceeded the second threshold, clearing the preexisting alarm condition. The trigger event notifications are traps. The first threshold may be zero or some number greater than zero. The second threshold varies as a function of time (e.g. the second threshold is based on past performance of a parameter that is represented by the trigger event notification).

In general, in still yet another aspect, the invention features a machine-based method for displaying alarm data. The method involves receiving alarm data in a data table having columns, data rows, and a subset of the columns designated as key columns, the columns each corresponding to an alarm data field, the data rows each corresponding to a different alarm, and the subset being such that for any given data row in the data table and for a tuple constructed from values of the given data row corresponding to each of the columns of the subset, the tuple uniquely identifies the given data row relative to correspondingly constructed tuples for all other data rows in the data table; receiving a set of uncollapsed columns that is a subset of the key columns; grouping the data rows into display rows according to the set of uncollapsed columns, such that a first data row is in a same display row as a second data row if the first data row and the second data row have matching values in each column in the set of uncollapsed columns; and rendering the data table as a display table populated with the columns of the data table and with the display rows instead of the data rows.

Other embodiments include one or more of the following. The rendering includes rendering placeholder symbols for cells in columns that are not in the set of key columns. The rendering also includes, if a column corresponds to a severity field of the alarm data, displaying in the cell of each row a value indicating the maximum severity among the alarm data corresponding to the row. The method further involves receiving user input that designates the key columns.

Other embodiments of these inventions include one or more of the following features. The step of determining involves, if the second time is within the redundancy window, setting the expiration time to be later than the second time and using the first alarm condition to represent the second notification; and, if the second time is not within the redundancy window, resetting the redundancy window to begin at the second time and designating the second alarm condition to represent the second notification. The trigger notification is a trap. The time intervals in the series of time intervals have a predetermined duration. The step of accumulating includes discarding values outside of a sliding window of time, relative to the trigger interval. The sliding window has a predetermined sliding duration.

In general, in yet still another aspect, the invention features a machine-based method for displaying alarm data. The method involves receiving alarm data in a data table having columns, data rows, and a subset of the columns designated as key columns, the columns each corresponding to an alarm data field, the data rows each corresponding to a different alarm, and the subset being such that for any given data row in the data table and for a tuple constructed from values of the given data row corresponding to each of the columns of the subset, the tuple uniquely identifies the given data row relative to correspondingly constructed tuples for all other data rows in the data table; receiving a set of uncollapsed columns that is a subset of the key columns; grouping the data rows into display rows according to the set of uncollapsed columns, such that a first data row is in a same display row as a second data row if the first data row and the second data row have matching values in each column in the set of uncollapsed columns; and rendering the data table as a display table populated with the columns of the data table and with the display rows instead of the data rows.

Other embodiments of this invention include one or more of the following features. The step of rendering involves rendering placeholder symbols for cells in columns that are not in the set of key columns. The step of rendering also includes, if a column corresponds to a severity field of the alarm data, displaying in the cell of each row a value indicating the maximum severity among the alarm data corresponding to the row. The method also includes receiving user input that designates the key columns.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A illustrates sections of a trap translation file.

FIG. 4B is an example of a trap translation file.

FIG. 12 shows an example of alarm table that is generated by the browser.

FIGS. 13A-C illustrate how column collapsing is used to filter or spatially deduplicate traps that generate an alarms.

FIGS. 14A-B further illustrate column collapsing.

Like reference symbols in the various drawings indicate like elements.

DETAILED DESCRIPTION

Figure 1:
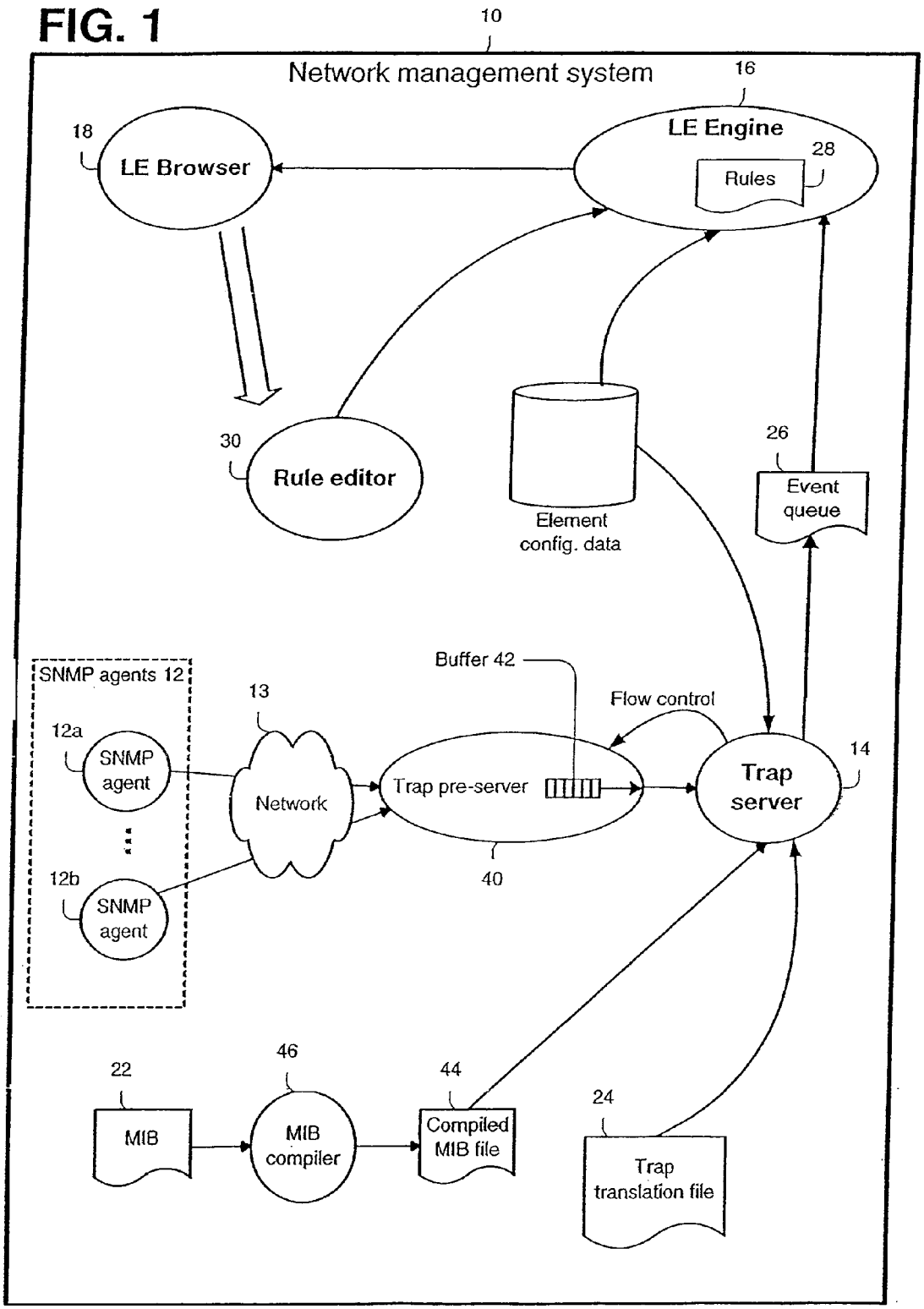
FIG. 1 is a block diagram of logical entities in a network monitoring system.
Figure 2:
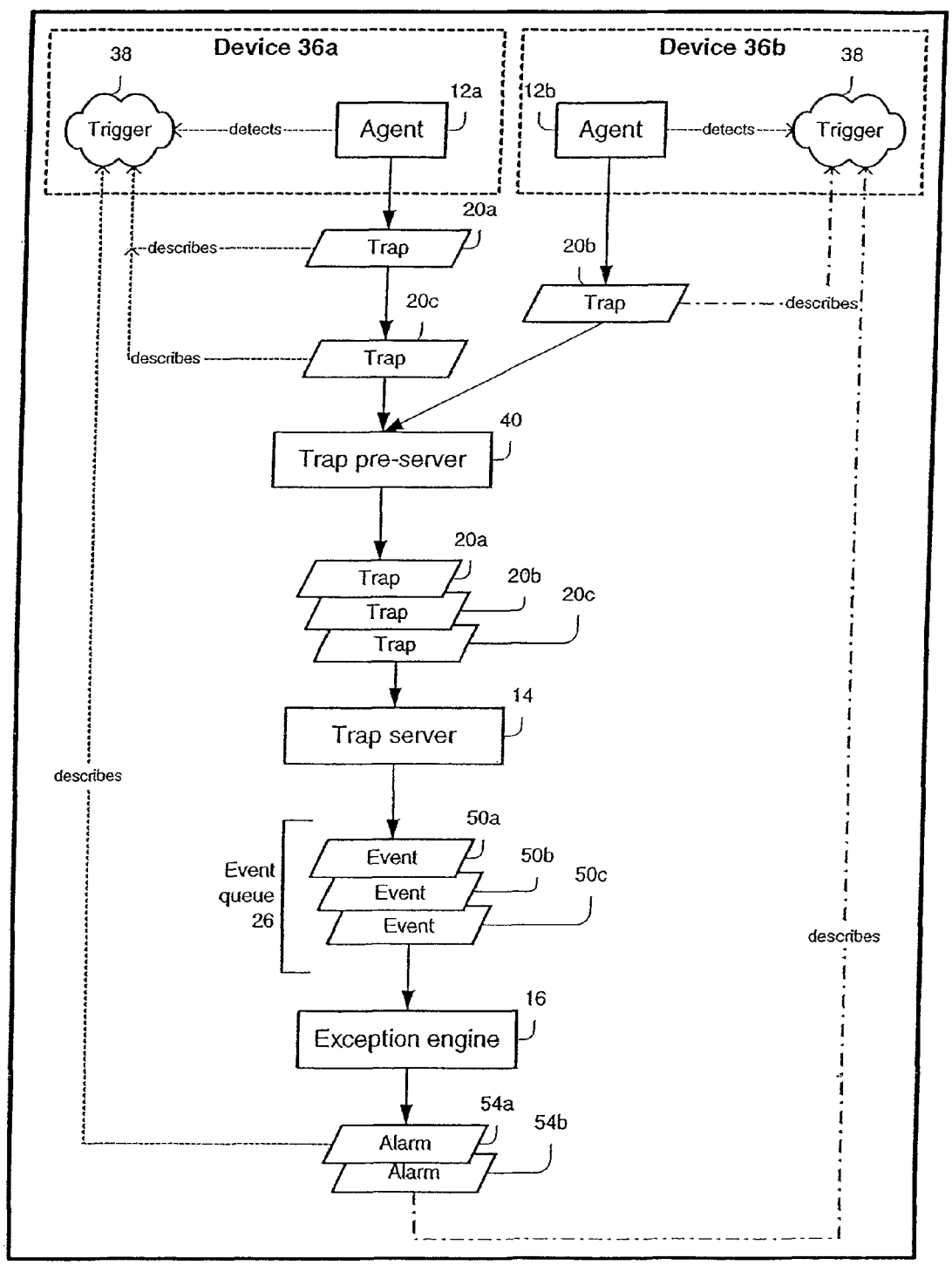
FIG. 2 is a data flow diagram showing traps being processed into alarms.

Referring to FIGS. 1 and 2, an NMS (network management system) 10 manages an IP (Internet Protocol) network 13. NMS 10 measures the performance and availability of services on network 13 and presents the measurements to human users, for example, network administrators.

NMS 10 is an automated system that human network administrators use to manage IP network 13. NMS 10 represents network infrastructure devices, devices that use the network, and, in general, any monitored device, as "elements" and tracks the individual network performance and availability of its elements. NMS 10 includes a heterogeneous collection of SNMP software agents 12 running on devices distributed across network 13. For example, agent 12a runs on device 36a, and agent 12b runs on device 36b.

Each SNMP agent 12 is a process that monitors its corresponding or associated network device 36 for the occurrence of a triggering event 38 and reports those events to a central location. More specifically, upon detecting a triggering event 38, SNMP agent 12 sends a trap 20 to a trap server 40. Each SNMP agent 12 is encoded in instructions processed by a corresponding network device 36. The instructions can be embedded into the hardware and logic of the device 36, or the instructions can be an optional software configuration of the device 36. As an example of the embedded configuration, device 36a is a router with a vendor-provided SNMP agent 12a. As an example of the software-based configuration, SNMP agent 12b is encoded in a third-party software program installed on a server device 36b.

In general, each agent 12 monitors its device on behalf of NMS 10, taking a collection of measurements of its device. Measurements often involve physical properties such as component failures, power supply problems, interruptions to network links, and so forth. Also, measurements can involve logical or traffic problems, for instance congestion problems due to an overloaded router in network 13. Furthermore, measurements can detect routine but noteworthy events such as a successful startup or shutdown. In practice, there is a great deal of variety among commercially available SNMP software agents 12. Often, the measurements made by a given agent 12 depend upon the particular function of the monitored device, for example a router, a switch, a file server, and so forth. The available measurements may further depend upon the manufacturer of the device: proprietary features of a particular manufacturer might not be available on a similar type of device from a different manufacturer. Still another degree of variation is due to customization. Administrators can configure an agent 12 to make particular measurements according their needs. In other words, even two devices of the same function, type, and manufacturer may have customized measurement settings.

The criteria for triggering events 38 are encoded in a MIB 22. Triggering events 38 can be defined for virtually any data or set of data that device 36 can be configured to detect and report via SNMP.

A MIB 22 provides a generalized architecture for expressing the properties that a given agent 12 measures. A MIB 22 specifies a collection of variables in an SNMP interface. Some of the variables represent properties that agent 12 is monitoring. A MIB 22 also defines the format of traps 20 that are sent from an agent 12 implementing the MIB 22. Furthermore, a MIB 22 specifies triggering conditions that indicate that a monitored value (or combination of values) has violated acceptable limits. A MIB 22 defines a trap 20 for agent 12 to send, for each such violation. Traps can also be sent when a measurement cannot be made at all.

Trap server 14 collects traps 20 for NMS 10 into a single, time-indexed stream. Trap server 14 also matches traps 20 to their respective MIBs 22, and interprets traps 20 according to trap translation files 24. Interpreted traps, or "events", have additional properties used by NMS 10, such as formats that standardize the raw data from heterogeneous traps.

Trap server 14 outputs event records to an event queue 26. The queue order reflects the order in which the corresponding traps arrived at the trap server. In addition, the trap server 14 also outputs a log of traps in raw form.

An exception engine 16 reads the event records from event queue 26 and detects when alarm conditions exist. An alarm condition occurs when values reported by traps fall outside acceptable ranges. To determine when and if such an alarm condition exists, exception engine 16 applies various rules 28 some of which detect and eliminate temporal duplication among the received traps in event queue 26. That is, besides detecting when alarms should be generated, exception engine 16 also uses rules 28 to detect when traps within a sequence of received traps are temporally redundant and actually represent the same event. As will be explained below in greater detail, rules 28 specify various detection patterns for detecting when an alarm conditions exists. In general, many of rules 28 fall into three general types, namely, a basic rule, a time-over-threshold rule, and a cumulative rate rule. When events or sequences of events have occurred that represent alarm conditions, exception engine 16 generates and maintains alarms and writes the alarms to an alarm database.

An exception browser 18 provides a user interface that allows a human user to investigate traps, events, and alarms. It also includes a rule editor 30 that allows the user to easily and efficiently create and modify rules 28.

The specific network management system elements shown in FIGS. 1 and 2 will now be described in greater detail.

Trap Pre-Server

The traps that agents 12 send to trap server 14 are received by a trap pre-server 40. Trap pre-server 40, which is a front-end process for the trap server, is capable of providing front-end low level filtering (ignore or drop traps) from specific sources and or of specific trap types. It is also capable of trap logging and script execution. But most importantly, as a front-end process, trap pre-server 40, using an internal buffer 14, provides trap buffering for trap server 14 to minimize trap loss during trap server restarts. As will be described later, trap server restarts are used to add new trap support to the system.

The queue in buffer 42 is limited in size and entries are limited by age. For example the default limits might be 1000 traps and 1 minute.

Trap pre-server 40 also serves to accommodate large spikes in the number of traps that are sent to trap server 15. Such an increase might occur for many different reasons. For example, a single router failure could cause many different devices 36 that are using that router to all experience network problems at the same time. The agents 12 for those devices could respond by all sending multiple traps to the trap server reporting various perspectives on the problem. By buffering the flow of traps to trap server 14, trap pre-server 40 prevents large increases in traps from overwhelming trap server 14.

Trap pre-server 40 records the arrival time of each trap 20 as perceived locally. Note that some existing traps include an indication of the time as known to the originating device 36. Often, however, it is impractical to expect that all devices 36 on a network are well synchronized in their clocks. By establishing the sequence in which traps 20 are processed as one based on time-of-arrival rather than time-of-sending, trap pre-server 40 provides a uniform, coherent ordering that is not affected by discrepancies among clocks on distributed network devices 36.

If more traps 20 arrive than trap pre-server 40 can process, trap pre-server 40 uses a leaky bucket scheme. That is, trap pre-server 40 processes as many traps 20 into buffer 42 as it can, subject to available computing resources. If additional traps 20 arrive that trap pre-server 40 cannot process, trap pre-server 40 discards them.

Trap Server

Trap server 14 receives traps from the front-end trap pre-server process and evaluates those traps based on definitions specified in trap rule files (TRFs). It then maps those traps to corresponding network system level elements (router parent, server parent, etc.) and delivers information pertaining to each trap to exception engine 16.

In order for the trap server to pick up support of newly certified traps the trap server will be restarted. The certification process will consist of the addition of new or modified external files (trap TRF files and MIB or MIB pre-compiled files). Trap server 14 reads these files during a process initialization, such as would occur after a restart.

Figure 3:
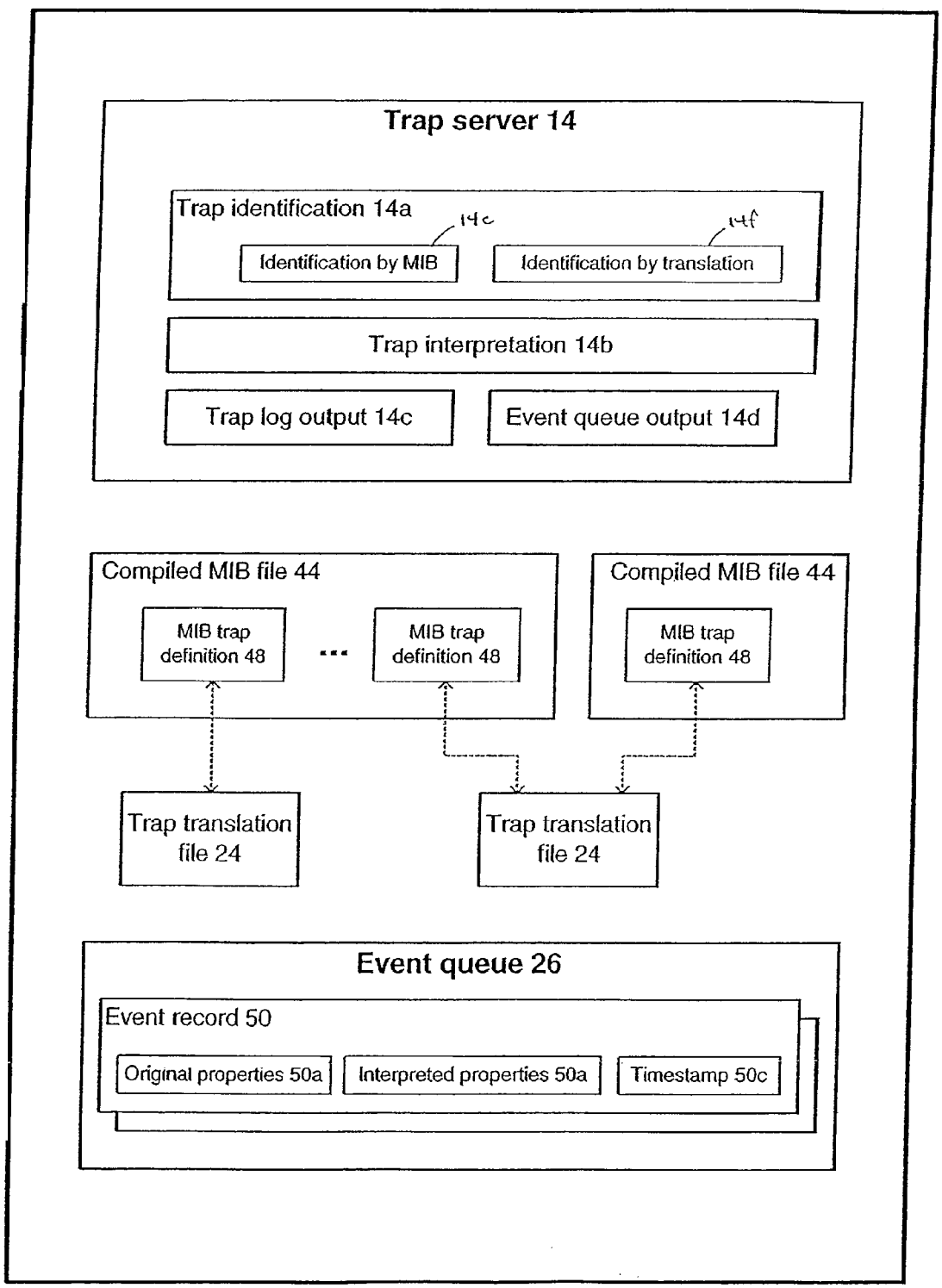
FIG. 3 is a block diagram of logical modules in a trap server and related data.

Referring to FIG. 3, trap server 14 includes processes such as trap identification process 14a, trap interpretation process 14b, event queue output process 14c, and trap log output process 14d. Each of these is described in greater detail below.

Trap Identification Process

Trap identification process 14a includes an identification-by-MIB process 14e and an identification-by-translation process 14f.

Identification-by-MIB Process

Identification-by-MIB process 14e identifies a trap according to a trap definition 48 contained in a compiled MIB file 44. A MIB compiler 46 converts a MIB file 22, which is largely human-readable text, into computer code that trap server 14 can process automatically.

Trap server 14 has a collection of compiled MIB files 44, each of which contains one or more trap definitions 48. A trap definition 48 specifies the variety of a trap and provides an explanation of the internal structure of the PDU (program data unit) of a trap. In particular, trap definition 48 specifies variable bindings.

SNMP defines how a given trap can be matched to its defining trap definition 48. For example, SNMP version 1 traps include generic trap type, a specific trap type, and an enterprise value. SNMP version 2 traps include a notification OID. Variable bindings can play a role as well, in either SNMP version, for certain kinds of trap. SNMP has a global identification scheme that allows a given trap definition 48 to be uniquely identified.

Before describing identification-by-translation process 14f, some description of trap translation file 24 is in order.

Trap Translation File

Referring to FIG. 4A, a trap translation file 24 specifies how to construct additional properties to be associated with a trap, based on the existing properties (i.e., bound variables) of the trap. Trap translation file 24 includes sections such as classification section 24a, element mapping section 24b, and interpretive information section 24c. One use of a trap translation file 24 is to map a particular trap or class of traps, which may be vendor-specific to the agent 12 or device 36 that originates the trap, to a standardized set of properties, such that all traps present a similar interface when processed by the Network Management System. Another use of trap translation file 24 is to reformat raw data into human-readable formats for presentation to users.

Classification section 24a specifies a matching expression 24d, which is an expression based on variables of trap 20. For a given set of bound variables, matching expression 24d evaluates to a Boolean value that indicates whether the trap is accepted by the trap translation file 24. In other words, matching expression 24d indicates whether the trap is eligible to be translated by the trap translation file 24. For example, in the instance appearing in FIG. 4A, acceptExpr is a value that represents the results of a matching test. The matching test includes three comparisons, all of which must be satisfied for the test to succeed. Specifically: the generic type of the trap must match the enumerated value for enterprise-specific types ("trapGenericType=enterpriseSpecific); the specific type of the trap must match the enumerated value for a status change in a frame relay address ("trapSpecificType=frDLCIStatusChange"); and the frame relay circuit state must match the enumerated value for invalidity ("frCircuitState=invalid"). In this case, frDLCIStatusChange and frCircuitState are bound variables described in the MIB that defines the trap.

Element mapping section 24b maps raw information within the trap to an element identity within the communications network managed by the Network Management System. For example, in the instance appearing in FIG. 4A, the IP address reported by the trap ("trapIpAddress") is mapped unchanged to the variable. "ipAddress", which identifies the element that this trap will be affiliated with. Note that this example is simple, but in some contexts there may be a need for more complex mappings—for instance, address translation between sub-networks, or the tracking of elements that are at a different scope than can be measured by an IP address alone. Element mapping section 24b provides a place for the definition of such mappings.

Information extraction section 24c contains expressions that define interpreted properties in terms of the variables of the corresponding trap. For example, in the instance appearing in FIG. 4A, a matchKey property is formed as a string combination of values from several bound variables, the values separated by colons. In the same section, a userMessage property is generated that reports the values of the bound variables frCircuitDlci and frCircuitIndex in the context of a well-formed English sentence.

The following presents a more detailed description of some specific details on how the fields in a trap translation file are used.

The "acceptExpr" field determines which traps will be processed by this trap rule. Trap rule acceptExpr are checked in order from most specific to most general. Only a single rule will apply to any trap.

The "eventName" field contains a user visible name for the event the rule produces. It is used mainly by the profile rule developer in developing the profiles and is not normally seen by the network operator. Event names should concisely and uniquely identify what happened. The TTF trap rules normalize the traps (and other events) received. Two different traps from two different vendors can mean the same thing. So, by mapping those two traps to the same event name, one can normalize the traps into a single event. When two or more traps are normalized into the same event name, then the following other settings should be the same: "event type" and "event description." Ideally, the component and matchKey assignments should be similar, but do not need to be identical.

The "eventDescription" field contains a user visible description of the event the rule produces. It is a longer "comment" that can be used to provide more detail than the event name.

The "eventType" field is a user visible category for the event the rule produces. It is used mainly by the profile rule developer in developing profiles. It can be used to view a subset of the event names when choosing an event while writing a rule. It is not normally seen by a network operator. Event types are based on broad technology groupings (e.g. ATM). Also, event type can be a comma separated list of event types.

The "ipAddress" field is used by the trap server to match the event to a specific element. Typically one might use: ipAddress=trapIpAddress The "matchKey" field is used by the exception engine to divide the events that it receives into "streams" for rules processing and deduplication. The exception engine separates events into streams based on element and event name. The match key can be used to add additional data to separate the events into smaller streams. The more information placed in the match key, the more streams will be generated by the engine, and the more alarms the user can potentially see. If the component is set, the match key should include the same data. For carrier traps, the match key often includes information that separates the individual events carried into separate streams. This information may be over and above the data used to identify the component.

The "component" field enables one to identify for the user the specific component within the device that generated the event. The trap server assigns an event only to the device level element, i.e., it identifies the system, router, RAS or event source element from which this event came. It does not know which interface, disk, or modem actually generated the trap. The component field allows one to add this additional information. The component need not be an element, for example, we can identify a user that has failed to log on. The network management system renders this field user visible so it can be seen by the network operator.

The "userMessage" field is a user visible field that adds additional information not visible elsewhere in the event. For example, if a trap indicates the temperature is too high, and a variable in the trap gives the current temperature, this data should appear in the userMessage.

The "eventCarrier" field is used to provide the end user with information on exactly what trap produced this event.

The "trapSense" field takes one of two values, Set and Clear. It indicates whether the condition (event) is present or not. Most traps are Set traps. A few are Clear traps.

Referring to FIG. 4B, the sections of trap translation file 24 are logical sections. In other words, the sections need not be contiguous within the actual layout of expressions in trap translation file 24. FIG. 4B shows a workable example of the example trap translation file 24 used in FIG. 4A. An expression from element mapping section 24b ("ipAddress=trapIpAddress") is interleaved with expressions from information extraction section 24c.

Identification-By-Translation Process

For a given trap, identification-by-translation process 14f finds a corresponding trap translation file 24. In particular, for a given trap, identification-by-translation process 14f evaluates an acceptance expression from classification section 24a, using properties from the given trap. As indicated in FIG. 3, a given trap translation file 24 can accept traps from more than one trap definition 28. Identification-by-translation process 14f iterates over the collection of trap translation files 24 until finding a match. When the Network Management System is properly configured, every trap corresponds to some trap translation file 24.

Trap Interpretation Process

Trap interpretation process 14b generates interpreted properties of a trap, based on rules stored in the corresponding trap translation file 24.

The values of bound variables as they exist in a trap are raw data, i.e., the values are not necessarily designed to be read by humans or third-party software. For example, the corresponding trap definition 48 might have been designed to produce traps that are optimized for processing efficiency, or for small size. Furthermore, for example for a trap from SNMP agent 12a that is built into router 36a, the values and the variable bindings themselves may be specific to the vendor that makes router 36a. The values in a trap might need to be reformatted, for instance to make them human-readable, to adapt them to an internal format to be used by the Network Management System, or to combine multiple values into a single, more-complex property.

Trap interpretation process 14b evaluates expressions in information extraction section 24c of the trap translation file 24 corresponding to a given trap. Each such expression produces a variable binding (an interpreted property) that trap interpretation process 14b associates with a trap. An event record 50 includes the original properties 52a of the trap together with interpreted properties 52b and a timestamp 52c indicating when the trap was received by trap pre-server 40.

Referring to FIG. 3, trap interpretation process 14b generates an event record 50 for a given trap.

Event Queue Output and Trap Log Output Processes

For a given trap, event queue output process 14c adds the corresponding event record 50 to event queue 26. Conceptually, event queue 26 is a FIFO (first in, first out) queue of event records 50. In practice, event queue 26 includes a series of one or more documents written to a trap file in shared storage. Each trap file contains a portion of event queue 26 stored as a periodically-written batch of event records 50. By default, event queue output process 14c transfers a batch of event records (i.e., the trap file) to exception engine 16 periodically, i.e., after the number of entries has reached a predetermined limit or after a maximum time limit has been reached, e.g. every thirty seconds. Upon transferring the file, trap server 14 notifies exception engine 16 that a new trap file is ready to be processed.

Trap log output process 14d writes traps in their original form to a log file. The log file is available to administrators, often for diagnostic purposes. Trap log output process 14d purges the log file periodically to keep its storage requirements within finite bounds.

Exception Engine

Referring to FIG. 2, exception engine 16 analyzes the records in event queue 26 to determine if and when any situations exist that warrant generating alarms 54. Exception engine 16 applies rules 28 to detect temporal redundancy among events 50 and generates alarms 54 that are not temporally redundant.

In general, exception engine 16 considers two events redundant when they arrive close to one another in time, and have the same event name, element, and key assigned by the trap translation file 24. The criteria for "closeness" in time are quantified in rules 28, as will be explained.

Traps that involve quantitative reports, such as the error rate on a given interface on a router, may have an additional dimension for matching, namely, quantitative similarity. When two traps arrive close to one another in time and report quantitative values within a similar range (the particular range depends on the type of information, and can be customized by the administrator to various tolerances), matching criteria consider the two traps the same. Conversely, two quantitative traps close in time, describing the same triggering situation 38, and accepted by the same trap translation file 24, will not match one another if they report widely different quantities. As an example, consider traps that report discard rates from routers, where the discard rates indicate the percentage of traffic not transmitted due to congestion. Such traps report a quantitative rate of discards. Administrators choose ranges of acceptable (e.g., 0 to 0.5%) and unacceptable values (more than 0.5%) for the discard rate. Two traps reporting discards within the same range may not be identical per se, but they may be close enough in value that the administrators want the automated monitoring of the Network Management System to handle them similarly. However, a trap reporting a discard rate of 0.02% would not match an otherwise similar trap (i.e., one of the same type, from the same router) that reports a discard rate of 4%.

Figure 5:
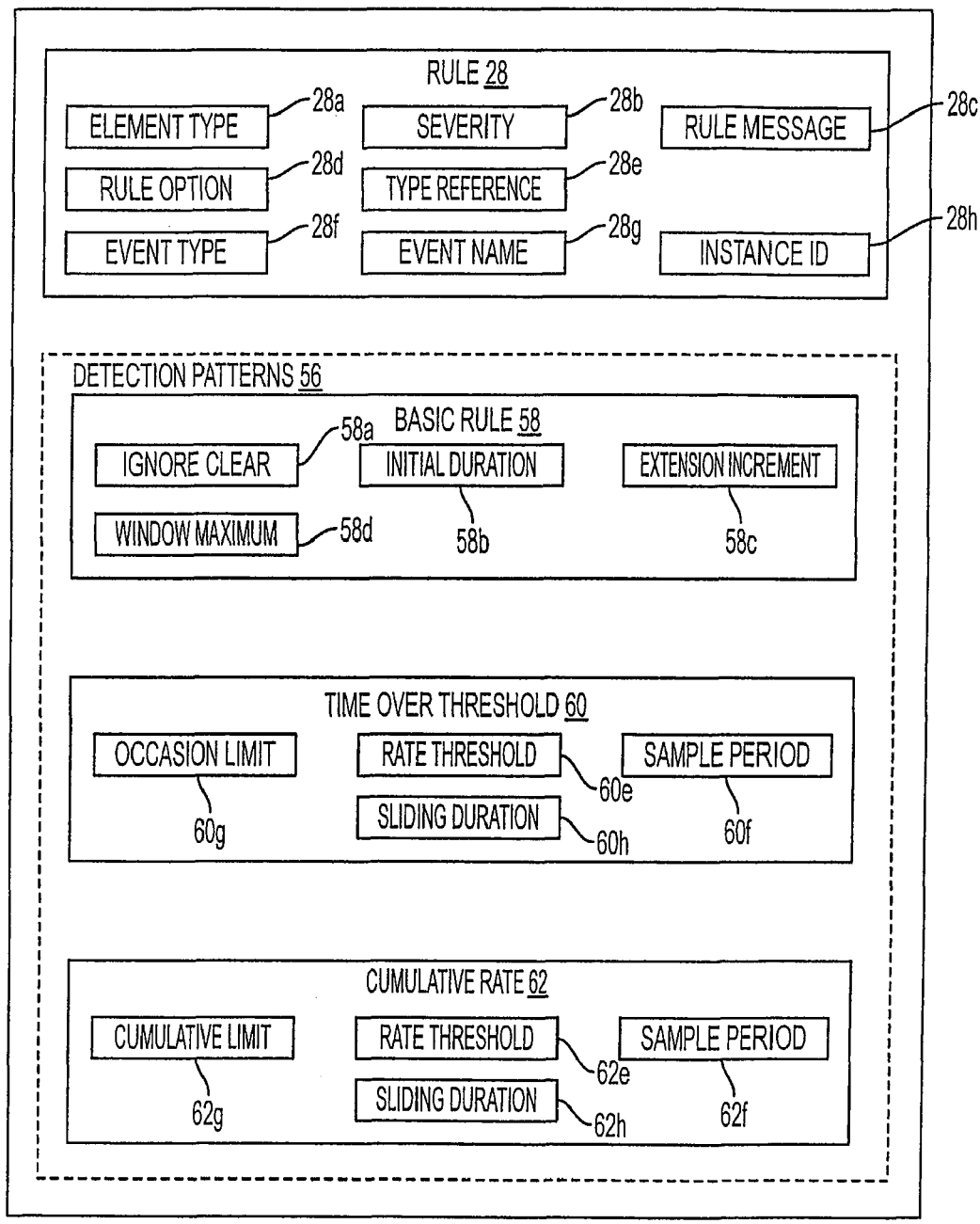
FIG. 5 is a block diagram of a rule and rule types.

Referring to FIG. 5, each instance of rule 28 includes element type 28a, severity 28b, rule message 28c, rule option 28d, type reference 28e, and instance ID 28h. Element type 28a specifies the type of element to which the instance of rule 28 should apply. Severity 28b and rule message 28c contain values passed in the alarms 54 that rule 28 generates. Rule option 28d specifies rule 28 as an event rule, different from other types of rules possibly available on exception engine. Instance ID 28h contains a value that uniquely identifies the instance of rule 28 relative to other instances. The meaning and use of these parameters will now be described in connection with specific examples of rules.

Detection Pattern

Type reference 28e specifies the detection pattern 56 for an instance of rule 28. A given rule 28 belongs to a single detection pattern 56. A detection pattern indicates a pattern of events that a rule 28 is designed to detect. Each detection pattern 56 has a corresponding process that applies rules that use the pattern, as will be explained in more detail. Possible values of type reference 28e include basic rule type 58, time-over-threshold rule type 60, and cumulative rate rule type 62.

Basic Rule

Referring to FIG. 5, broadly, a rule 28 of basic rule type 58 raises an alarm 54 after detecting an event or trap, which is designated as a precipitating event. The basic rule 28 specifies a window of time (also referred to as a redundancy window) during which subsequent reported events that are similar to the precipitating event will be considered redundant and will not cause further alarms to be generated. Basic rule type 58 includes fields for ignore clear 58a, and initial duration 58b, and it optionally includes fields for extension increment 58c, and window maximum 58d.

Initial duration 58b specifies the initial length of redundancy window. Each time a similar event arrives while the redundancy window is active, basic rule type 58 extends the redundancy window. Extension increment 58c specifies the length of that extension. All similar events occurring in the redundancy window are represented by the initial alarm 54 that was raised for the precipitating event. If a similar event arrives after the redundancy window expires, the similar event becomes a precipitating event for a new alarm and a new redundancy window. Under this approach, the window can grow without bound as long as redundant events keep the alarm active. Optionally, basic rule 28 can constrain the redundancy window from being extended indefinitely by the value that is stored in window maximum 58d. That is, window maximum 58d specifies a limit on the size of the total duration of the redundancy window. Also optionally, the extension increment can be set equal to the initial duration, in which case there is no need for the extension increment field 58c.

In practice, the redundancy window represents a period of time during which the exception engine is waiting for a clear period to occur, i.e., a period during which no events arrive that are redundant to the precipitating event. Initial duration 58b and extension increment 58c determine the length of the clear period.

Ignore clear 58a is a Boolean value indicating whether clear traps will be allowed to dismiss or clear an alarm condition. A clear trap indicates that an earlier reported condition has ended. When ignore clear 58a is false, the exception engine is permitted to close a redundancy window immediately upon receiving a clear trap.

Figure 6A:
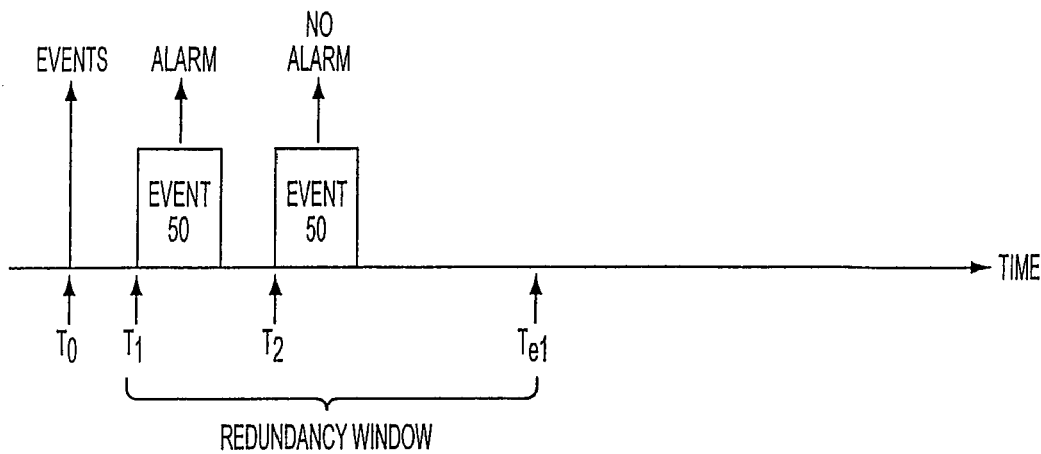
FIGS. 6A-C show timelines of example events processed by a basic rule.
Figure 6B:
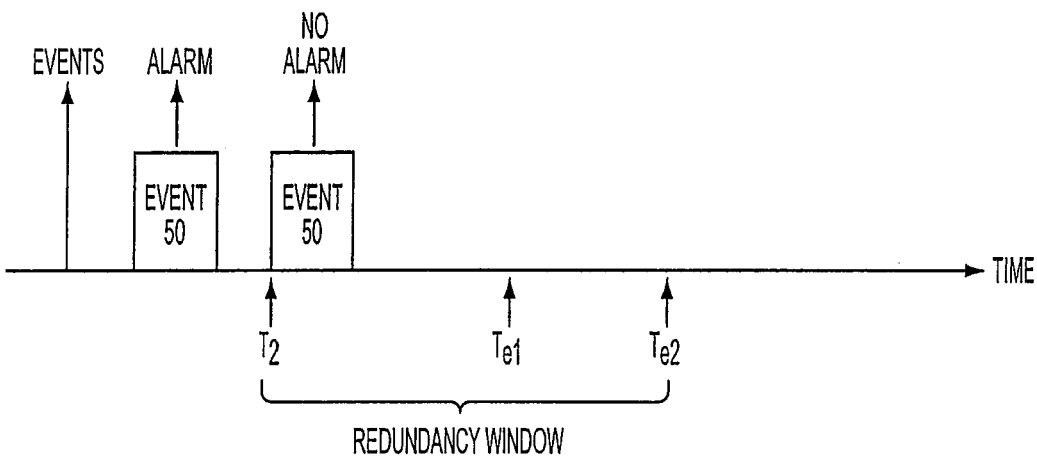
Figure 6C:
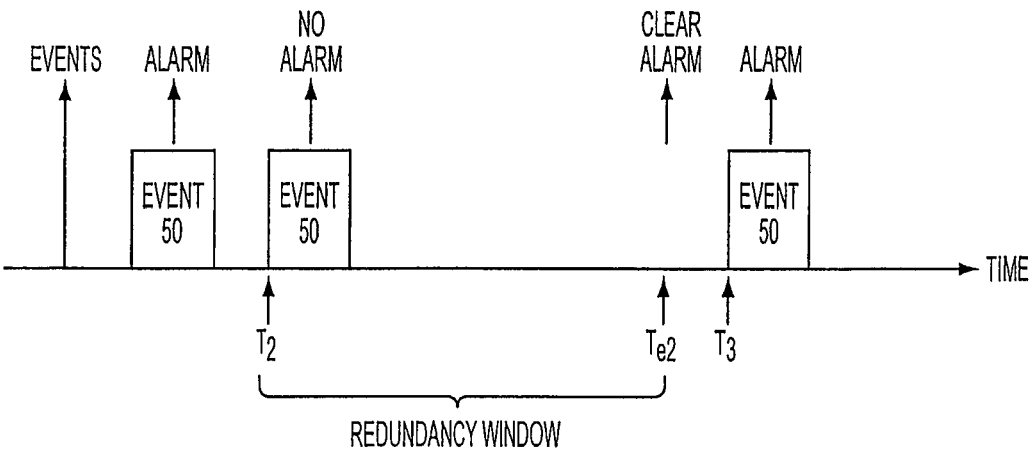

FIGS. 6A-C illustrate how this rule type operates. Assume that a trap is received at time $T_1$. If there are no pending alarms for that trap type, the exception engine will generate an alarm upon receiving this trap and it will establish a redundancy window which terminates at later time $T_{e1}$, as illustrated. If the next received trap occurs $\Delta T_D$ after T1, i.e., at time $T_2$, and if that time $T_2$ is within the redundancy window previously established (i.e., $T_2 < T_{e1}$), the exception engine will not generate another alarm but will instead extend the redundancy window to $T_{e2} = T_2 + \Delta T_D$.

If no further traps are received before $T_{e2}$, then the exception engine will clear the pending alarm and wait for the next trap. Upon receiving the next trap at time $T_3$, which will be after the redundancy window has expired, the exception engine will again raise an alarm and repeat the process just described.

Other formulae for extending the redundancy window could be constructed. For example, increasing the size of the extension by a non-linear factor.

Time-Over-Threshold Rule

Broadly, a time-over-threshold rule type 60 alarms when the rate of trap reception is over a specified threshold for a specific number of minutes within a specified (sliding) window time period.

In general, time-over-threshold rule type 60 periodically samples the rate at which similar events arrive. That rate is compared to a threshold. When the rate exceeds the threshold, time-over-threshold rule type 60 increments a counter for that sample period thereby indicating that the current sample period is an occasion during which an overage was detected. Every sample period, the rule sums the counters for all sample periods within the sliding window, which is an immediately preceding period of time including the present sampled time. If that sum reaches or exceeds a specified limit (i.e., the maximum amount of time for which the rate can exceed the threshold within a window of time), time-over-threshold rule type 60 raises an alarm 54 and opens a redundancy window. It maintains the redundancy window in a manner that is similar to the way the basic rule type 58 maintained its redundancy window. After the redundancy window expires, time-over-threshold rule type 60 clears the alarm.

In the case when the redundancy window is set equal to the duration between sample times, the rule will work as follows. Each time quanta after the alarm is raised, the system re-evaluates the condition described above. If the result is that the alarm should be kept open, then the alarm is kept open and the redundancy window is extended to the next sample time. If the result is that the alarm should not be active, then the redundancy window immediately expires and the alarm is cleared. If subsequently after the alarm is cleared, the algorithm indicates the alarm should be active, then a new instance of the alarm is raised.

Time-over-threshold rule type 60 includes fields for a rate threshold 60e, a sample period 60f, an occasion limit 60g, and a sliding window duration 60h. Rate threshold 60e specifies the threshold for the sample rate. Sample period 60f specifies the frequency at which the rate is sampled. Occasion limit 60g specifies a predetermined limit on the permissible amount of time that the sampled rate can exceed rate threshold 60e. A sliding window duration 60h specifies the period of time over which the sum is computed.

The sliding time window is implemented as a circular buffer of trap-received-count buckets, one bucket per one-minute time quanta.

The threshold can be as small as zero, and the counter limit can be as small as one. For example, an extremely simple policy for events of a given type would be to raise one alarm for every such event. A time-over-threshold rule type 60 could implement this policy by specifying a threshold of zero and a counter limit of one.

Cumulative Rate Rule

Broadly, a cumulative rate rule type 62 alarms when the total number of traps received in a specified (sliding) time period exceeds a specified value. For instance, such a rule would alarm when more than 25 traps of type T are received in an hour.

In general, cumulative rate rule type 62 periodically samples the rate at which similar events arrive. Cumulative rate rule type 62 compares that rate to a threshold. When the rate exceeds the threshold, cumulative rate rule type 62 adds the amount by which it exceeds the threshold to a bucket for that sampled time period. Every sample period, the rule also sums the amounts in the buckets for all sample periods within the sliding window, which is an immediately preceding period of time including the present sampled time. If that sum reaches or exceeds a specified limit, rule type 62 raises an alarm and opens a redundancy window. It maintains the redundancy window in a manner that is similar to the way basic rule type 58 maintains its redundancy window. After the redundancy window expires, cumulative rate rule type 62 clears the alarm.

In the case when the redundancy window is set equal to the duration between sample times, the rule will work as follows. Each time quanta after the alarm is raised, the system re-evaluates the condition described above. If the result is that the alarm should be kept open, then the alarm is kept open and the redundancy window is extended to the next sample time. If the result is that the alarm should not be active, then the redundancy window immediately expires and the alarm is cleared. If subsequently after the alarm is cleared, the algorithm indicates the alarm should be active, then a new instance of the alarm is raised.

Cumulative rate rule type 62 includes fields for rate threshold 62e, sample period 62f, cumulative limit 62g, and sliding duration 62h. Rate threshold 62e, sample period 62f, and sliding duration 62h operate like their counterparts of the same names in time-over-threshold rule type 60. Also, as in the implementation of the time-over-threshold rule type 60, the sliding time window is implemented as a circular buffer of trap-received-count buckets, one bucket per one-minute time quanta.

One implementation of this rule uses a threshold of zero, in which case the rule simply accumulates the rates for a period equal to the sliding window.

In both the case of the time-over-threshold rule type and the cumulative rate rule type, there are modified versions of those rules that involve computing a threshold or baseline value based on past performance of the parameter that is represented by the trap. This permits the baseline or threshold to change as a function of time. This is particularly useful in the case of parameters for which the more meaningful test for when to raise an alarm is whether the value for that parameter increases rapidly and not whether the value is above a particular fixed threshold. The baseline is computed, for example, by storing the data values for a past period of time sufficiently long to cause the computed threshold or baseline to accurately reflect the average performance of the value being represented.

Rules of the above-described basic types can also be combined in at least two ways, one way referred to as intermediate-result based and the other way referred to as time-period based.

According to the intermediate-result based approach, each rule that is being combined generates an intermediate result, which is either true or false. The AND of these "intermediate results" is calculated every time the exception engine tests for alarms (or potentially once a minute). The value of this computation is then used as the parameter that is tested to determine whether an alarm should be raised. This method has the following advantages. The rules can be combined without regard for sampling rate, sample time-bucket size, sliding time window size, or trap type. Also, users writing rules can more easily understand how the AND is done by generating alarms for each clause along with the complete rule and then observing alarms from each clause plus ones from the complete rule. In addition, very little additional calculation is required to AND the Boolean values of two or more rules.

According to the time-period based approach, for each time period, for each clause, "is condition true during this poll period?" is evaluated. The results are ANDed together and become the value for that time period. This would typically be used to calculate each time period in a complex time over threshold rule.

Rule Processes

The exception engine includes processes to apply rules, including a basic application process, a time-over-threshold application process, and a cumulative rate application process. In general, exception engine 16 maintains an instance of a rule-applying process for each element being monitored and each event rule applied to that event.

Exception Browser

Exception browser 18 displays the alarms that are generated by the exception engine through a table of alarms such as is illustrated by FIG. 12. This particular table of alarms includes columns for severity, start time, end time, element name, rule message, component, IP address, event carrier, and description.

The entry in the IP address column is the IP address of the component or element that is the subject of the event. The entry in the component column identifies the part of the device or system that is the subject of the event. The entry in the event carrier column indicates how the event was received (e.g. the protocol). And the entry in the description column is a formatted message string that describes the problem. Further columns are also possible, such as the identity of the group to which the element belongs, the alarm type, and the profile.

There are, of course, other columns than those shown in FIG. 12 that could be used to display the alarm data. Which particular columns are used is a question of which information is most useful to the network administrator or the user.

In any event, for the alarm data there is a primary key that is unique and that is made from a set of the data fields for the alarms. One possible primary key might be the following: Profile, Group, Element, AlarmType, Time(s), and Component. The browser provides the user with the ability to collapse or refine the table of alarms by on removing different elements of the primary key. Indeed, most elements of the key could be removed. By removing elements of the primary key, the items in the displayed table would then collapse down to a more refined level of alarms and the browser would also sum the alarm counts for the multiple rows that were combined into a single entry.

Examples of how this works are presented in FIGS. 13A-C and FIGS. 14A-B.

FIG. 13A shows an alarm table without removing part of the primary key. In this example, the columns represent element, "Component," "Profile," "Group," "AlarmType," "StartTime," and "EndTime." The last column entitled "Count" gives the number of alarms which were detected for that particular network entity. If "Component" is removed as part of the key, the browser collapses the alarm table and displays the smaller table shown in FIG. 13B. Note that the browser combined the first and second entries for the components identified as "Interface1" and "Interface2" into a single entry and in doing so also summed the counts for those two entries. It did not collapse the third entry into this single entry because the third entry had a different EndTime from the first two entries. Note that the collapse column is represented with a wildcard entry (i.e., *).

To further illustrate the technique of collapsing views, now assume that the user removes both Component and EndTime as part of the key. The resulting alarm table is shown in FIG. 13C. In this case, EndTime no longer become a way of distinguishing the first and second entries shown in the alarm table of FIG. 13B and so the browser combines these two rows for Router1 into a single row and sums the counts to arrive at the total count for the collapsed row.

Another approach could be to remove "Element" from the key. An example of this is shown in FIGS. 14A and B. FIG. 14A shows the "full" alarm table without any collapsing. FIG. 14B shows the same alarm table after it has been collapsed on "Element." In this case, the browser combines the last three rows all of which have the same values for the remaining key columns. Since the AlarmType of the first row is different form the AlarmType of the last three rows, the browser does not collapse this row into the other three but continues to display it as a separate row.

Figure 15:
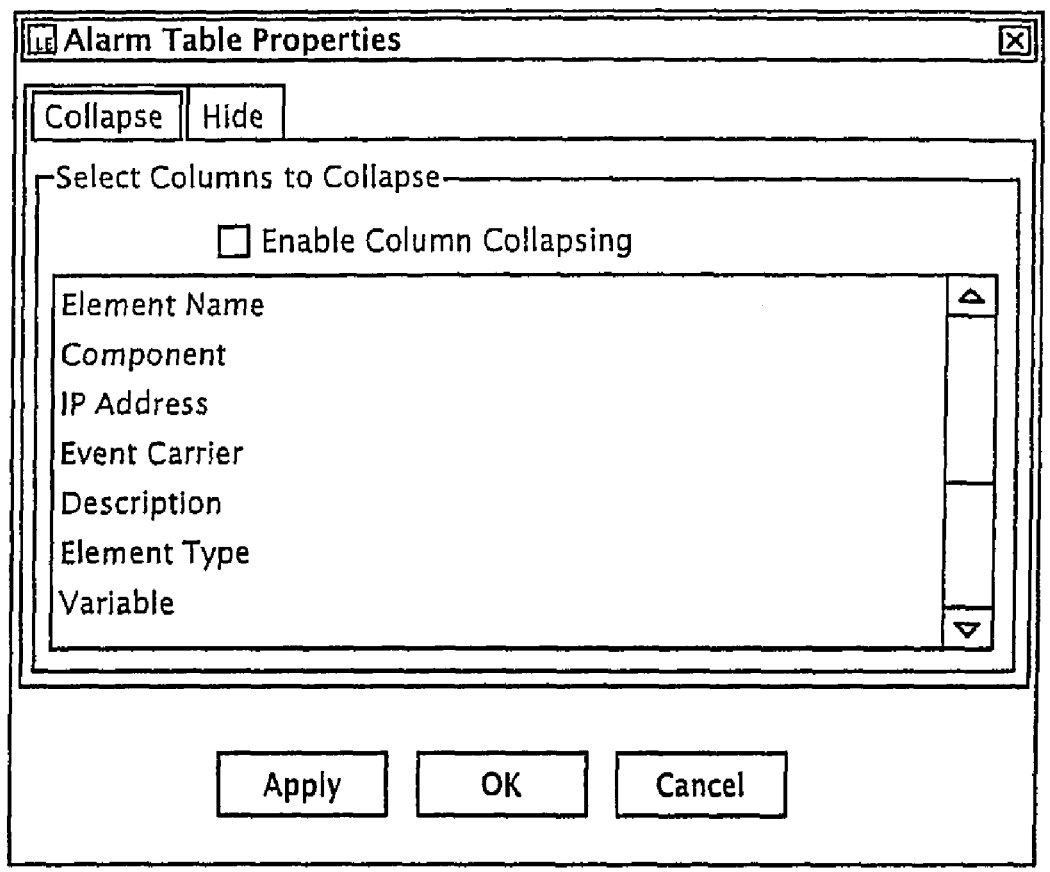
FIG. 15 shows the Alarm Table Properties page dialog screen.

Referring to FIG. 15, the browser presents a dialog to the user enabling him to select which primary key columns to keep active and which to collapse on. This dialog is referred to as the Alarm Table Properties page dialog. To collapse specific columns, the user selects the column or columns from the List Box that he or she wishes to act upon. To unselect the last field you must hold down "CONTROL" and click on it with the mouse. When the user is satisfied with the selections, he clicks the Apply button and the browser immediately displays the results (while leaving the dialog open). Alternatively, the user can click OK which causes the browser to apply the changes and close the dialog.

Rule Editor

Figure 7:
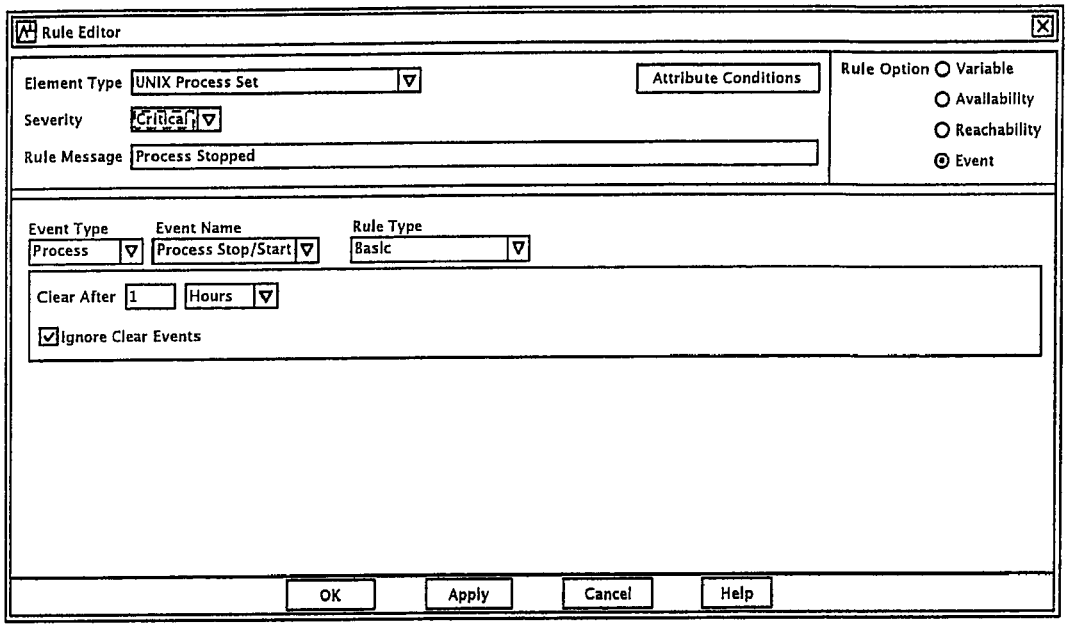
FIG. 7 shows a rule editor screen through which a user can construct a rule that is a basic rule type.

Rule editor 30 provides a graphical user interface by means of which a user can easily generate rules of the basic types described above. An example of a graphical interface that rule editor 30 presents to a user is shown in FIG. 7. The screen has a number of fields through which the user enters information to construct a rule. The input fields include an element type field 100, a severity field 102, a rule message field 104, an event type field 106, an event name field 108, and a rule type field 110. For all of the just-mentioned entry fields other than the rule message field, the editor presents to the user a drop down box/radio button listing the choices from which the user makes a selection.

When the user selects an element type, the rule editor does not modify the available choices in the rest of the dialog but it will modify the availability of "Attribute Conditions" described below. The element type only causes the rule editor to restrict the elements that a rule applies to within a multi-technology group. On the other hand, when the user chooses an event type, the rule editor restricts the available choices of event names to the ones of that type. The categorization is by vendor, device structure, or use and there is an "All" entry that in response to which the rule editor does not restrict the available event names. In the drop down boxes, both event categories and event names are sorted alphabetically.

Figure 10:
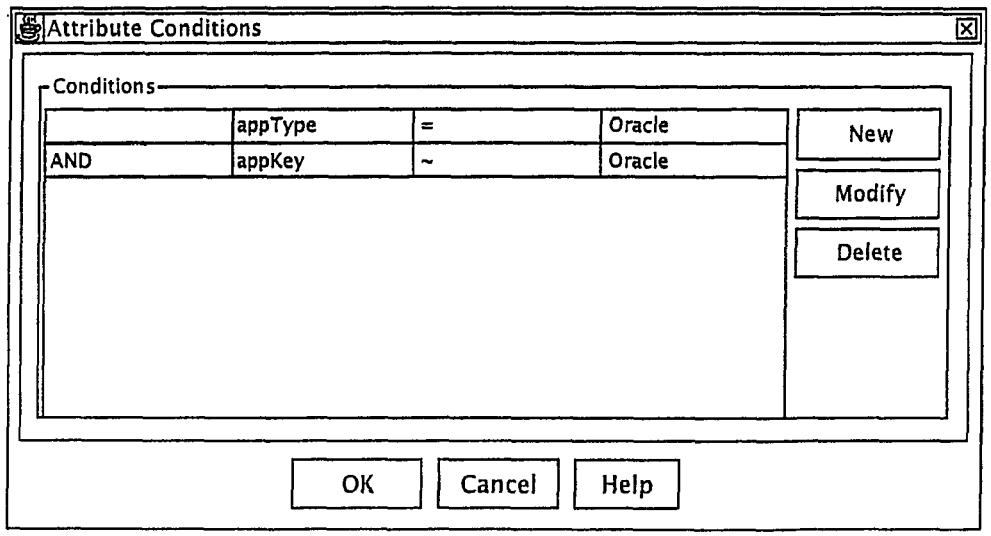
FIG. 10 shows an "Attribute Conditions . . . " dialog box.
Figure 11:
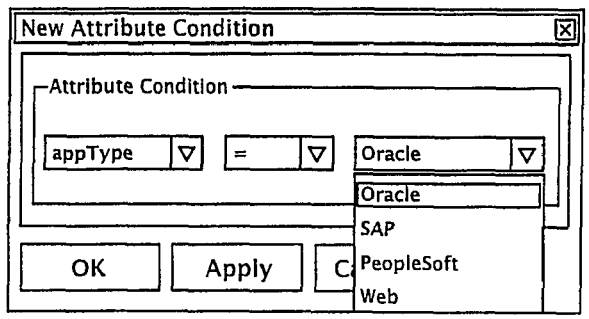
FIG. 11 shows a "New Attribute Condition" dialog box.

The graphical interface presented by the rule editor also includes a "Attribute Conditions . . . " button. In response to the user selecting this button, the rule editor brings up a new dialog as shown in FIG. 10. The new dialog lists the conditions currently in effect for this rule (initially none). The user can add an arbitrary number of conditions and they are ANDed together. Each condition consists of an attribute name, an operator, and a value. There are buttons for deleting, adding and changing conditions. The "New . . . " button causes the rule editor to bring up a "New Attribute Condition" dialog, such as is shown in FIG. 1.

The "New Attribute Condition" dialog provides for the definition of one condition by allowing the user to choose attribute, operator, and value. The attribute can be picked from a pre-defined list that the rule editor populates based on the element type currently chosen for the rule that is being worked on. In the illustrated example, the element type for the rule is "FirstSense Response Path," therefore the attribute list shows "appType" and "appKey" which are the attributes of elements of that type. The user can pick the operator from a pre-defined list of standard operators. The list content may depend on the attribute chosen in that a string match operator only applies to attributes of type string. For some attributes, the user selects the value from a pre-defined list. For example, in the above-mentioned "appType" example, values are pre-defined. For other attributes, such as the "speed" attribute of LAN elements, the ComboBox for this field becomes an editable text field.

Whenever selections are changed that other selections depended on, the rule editor causes the latter to revert to default values. For instance, in the above example, if the attribute is changed from "appType" to "appKey", the selection of the "Oracle" value will get undone and a default value for the "appKey" attribute will appear instead. By the same token, whenever the element type is changed in the Rule Editor window, all previously made condition definitions will be lost, since they may not apply to the newly chosen element type.

The "Modify . . . " button causes the rule editor to bring up a similar dialog as the "New . . . " button.

Figure 8:
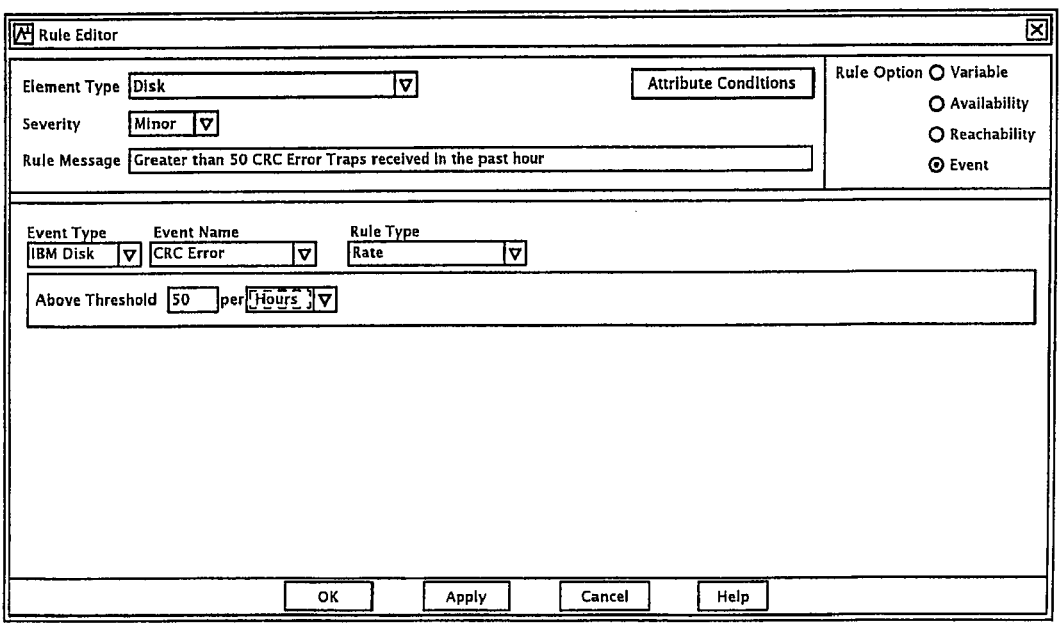
FIG. 8 shows a rule editor screen through which a user can construct a rule that is a rate rule type.
Figure 9:
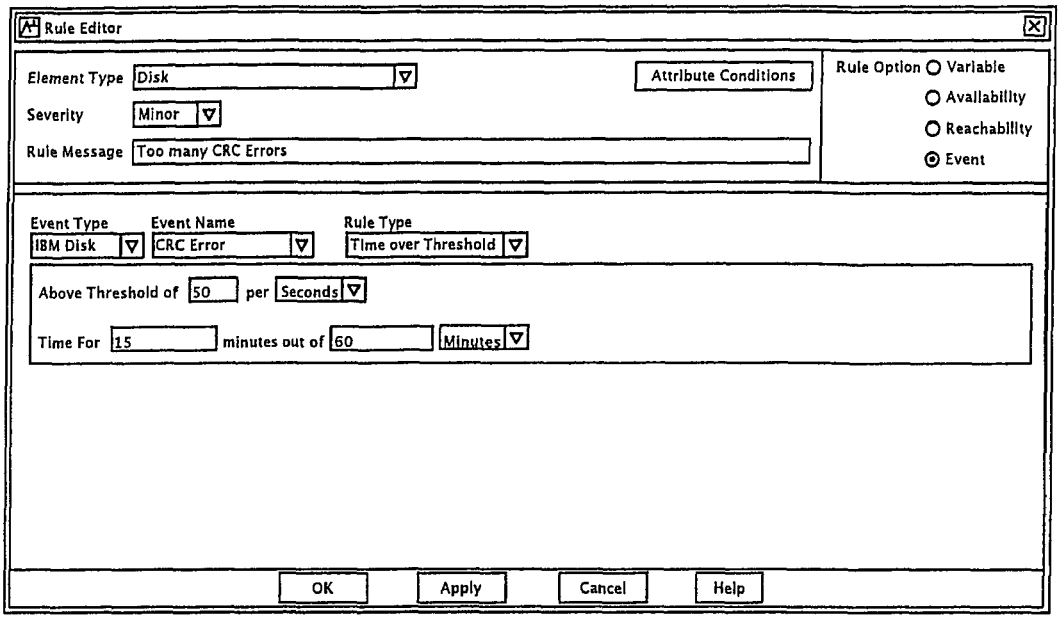
FIG. 9 shows a rule editor screen through which a user can construct a rule that is a time-over-threshold rule type.

FIGS. 7, 8 and 9 show one screen shot for three user input interfaces, one for each of three possible rule types for event rules, namely, the basic rule type, the rate rule type, and the time-over-threshold rule type, respectively. In these user interfaces, the entry fields that stay the same are for the selection of the event type, event name and rule type. Selecting a event name fills in a default Rule Message consisting of the event name if the user has not typed anything in the message field since last choosing the event rule option. As should be apparent form the figures, the particular fields that are displayed in the lower half of the screen depend upon the rule type that is selected.

Referring to FIG. 7 in particular, when the user selects the basic rule type, the rule editor requires that two parameters be entered, namely, one to specify the timeout value after which a raised alarm clears, and a checkbox to indicate whether clear traps of the same event name should cause a raised alarm to clear or not. The rule editor presents the user with entry fields to enter this information. Once all of the appropriate entries have been made, the user activates an "OK" button and the rule editor compiles the rule.

Referring to FIG. 8, when the rate rule type is selected, the rule editor allows the user to specify a rate or frequency as a threshold above which an alarm is raised. The inputs are a number and a time unit (hour, minute or second).

Referring to FIG. 9, when the time-over-threshold rule type is selected, the rule editor also allows for the specification of a rate, but, like with the time-over-threshold rule types, it requires the additional parameters for how many minutes out of what time period should be considered for time-over-threshold.

It should be understood that the above-described functionality is implemented on one or more digital processors programmed appropriately. These one or more digital processors have whatever input and output interfaces and devices are required to implement the described functionality (including keyboards, display units, modems, cable interfaces) and they include data storage, both internal and external, for storing the program and the data that are discussed herein.

Optimization of Predicate Evaluation in a Trap Rule System

Traps are often received by a management station at high rates, so the performance of a trap classifier is an important consideration. Although the basic classification of a trap uses only three type variables whose values are present in the incoming trap, vendors have supplied many additional proprietary schemes for trap designation, often sub-classifying a type under a unique triplet with many different sub-types, including some which require complex predicates to recognize, such as pattern-matching of strings.

In order to supply a broadly-applicable while easy-to-use classification system, a general-purpose rule language was designed, based on the boolean expression capabilities found in most computer languages. The goal is to provide well-known language constructs with which the rule writer can express the desired matching with ease and expressiveness.

In offering a general-purpose language facility, direct user control over the matching process is sacrificed to the goal of ease of use. The following description shows how to compensate for this loss.

The work described herein represents a first step in automated predicate optimization, handling top-level conjunctions and disjunctions of equality-based primitive predicates. An important result is that the presence of predicates opaque to this analysis do not result in dismissing the entire expression, but simply reduces the effectiveness of the optimization.

Figure 16:
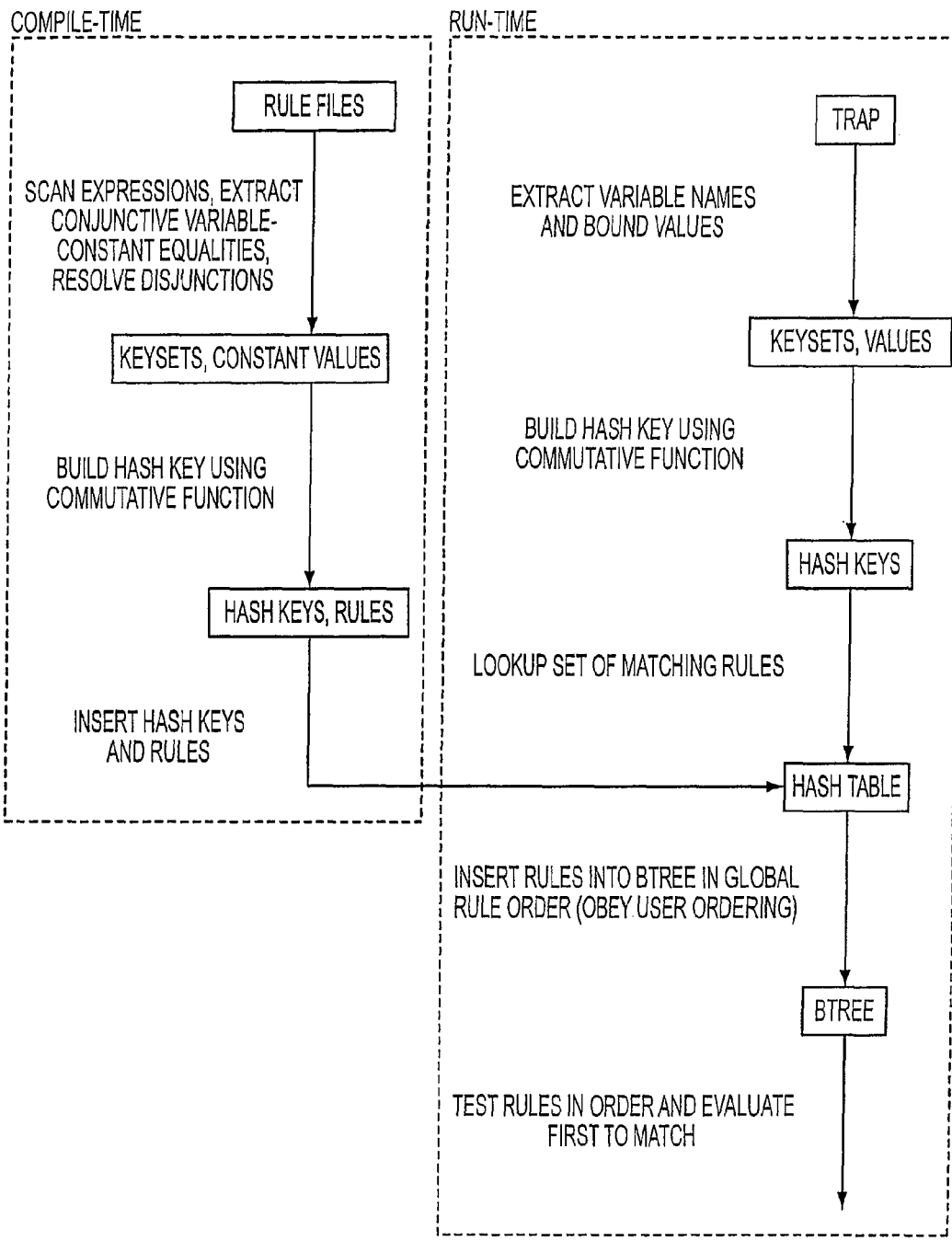
FIG. 16 shows the basic structure of the rule system.

FIG. 16 shows the basic structure of the rule system. In the following, compile-time refers to the time during which predicates are analyzed; this is in fact when the trap reception server is started and loaded with rules. Run-time refers to the in situ operation of the trap reception server, receiving traps, classifying them, and passing them to the next stage for analysis and display.

The following sections detail the operation of the rule optimizer.

Structure of the Rule System

The trap rule system consists of a set of files, each of which contains a set of rules to be matched against an incoming trap. Each rule is of the form:

(predicate, action)

where predicate is a boolean expression containing primitive predicates of various kinds.

Rules are tested in the order in which they appear in a file (the inter-file order is undefined). Testing involves evaluating each predicate against the binding environment produced by the incoming trap. When a rule predicate evaluates to true, the rule is said to be accepted, and the action portion of the rule is executed. The following description focuses on the process of testing the rule predicates.

It is easily seen that one way to find a matching rule is simply to scan the rules in some fixed order (obeying the intra-file ordering constraint) until a match is found. Naturally, this becomes more inefficient as the number of rules grows. The following describes a method whereby a matching predicate may be found at very high speed.

Rule Files

The entire set of rules in the system is contained in a set of rule files. Rules are guaranteed to be tested in the order in which a user wrote them within a file, but there is no defined inter-file ordering. The major reason for the ordering is to support fall-through predicates, where a set of more-specific tests is followed by a more-general test which catches the input should the specific ones fail.

Without loss of generality we can define a total order on the rules, obeying the intra-file constraints, based on some arbitrary file order (e.g., load order). The optimizer utilizes this ordering, as will be seen.

The rule set can thus be defined as in the following example:

$$\left.\begin{array}{l} r_1 \\ r_2 \\ r_3 \end{array}\right\} F_1$$

$$\left.\begin{array}{l} r_4 \\ r_5 \\ r_6 \\ r_7 \end{array}\right\} F_2$$

$$\left.\begin{array}{l} r_8 \\ r_9 \\ r_{10} \\ r_{11} \end{array}\right\} F_3$$

More generally, if $r_{ij}$ represents the $i^{th}$ rule of the $j^{th}$ file ($0 \leq i \leq$ number of rules in $F_j$; i.e., i is a local index), then there exists a bijective function $f: \{r_{ij}\} \rightarrow N$, such that for any pair of rules $r_{kj}$ and $r_{ij}$, $k<1$ implies $f(r_{kj})<f(r_{ij})$.

Rule Predicate Syntax

The predicate portion of a rule is an arbitrary boolean expression composed of primitive predicate functions and the boolean connectives & (and), | (or) and ! (not). Primitive predicates can be formed from the equality operator, the standard arithmetic functions +, − *, and /, and primitive functions discussed in more detail later.

Several variables are available as input to the predicates. Some are built-in variables, and are defined based on information inherent in an snmp trap:

| | |
|---|---|
| trapGenericType | Number; the snmp generic trap type number |
| trapSpecificType | Number; the snmp enterprise-specific type number |
| trapEnterprise | Oid; the snmp enterprise prefix |

These variables form the basis of trap classification. A typical rule predicate needs only these three variables to discriminate traps, for example:

trapGenericType=6 & trapSpecificType=42 & trapEnterprise=acmeOid

Rules may also use functions either as direct predicates or as transformers to a set of values or constants. Rules may also use disjunctions and negations, for example:

trapGenericType=6 & trapEnterprise=acmeOid & (trapSpecificType=42|trapSpecificType=43)

or trapGenericType=6 & trapEnterprise=acmeOid & !(trapSpecificType=42|trapSpecificType=43)

Detected Patterns of Optimization

The optimizer detects any term containing predicates of the form v=k, where v is a variable and k is any constant expression—i.e., one which evaluates to a constant at compile-time. A term of this sort is called a variable-constant equality.

Such terms may be embedded in any top-level conjunction, which may in turn contain disjunctions. A top-level conjunction may contain terms other than variable-constant equalities. Such terms are simply ignored as unanalyzable in the current system. This does not destroy the value of the analyzed conjunction; as we shall see, the optimizer gracefully degrades, simply narrowing the field to a greater number of rules than it would should the term be analyzable.

Disjunctions are handled conceptually by distributive expansion with its containing conjunction. A complete expansion results in a top-level disjunction of conjunctions, which is then in essence separated into separate tests on the same rule. For example, if $r_1$=(a & (b|c), action), then we transform this into $r_1$=(a & b|a & c, action), and in turn form two rules with the same action:

$r_{1a}$=(a & b, action)
$r_{1b}$=(a & c, action)

The mechanism for performing this expansion uses an in-place tree walk algorithm as described later.

Operation of the Trap Rule System Under the Optimizer

The aim of the optimizer is to reduce, by a large amount, the number of rules tested in order to match an incoming trap. An incoming trap is processed as follows:

1. The trap is read, and variables are created for the standard indicators trapGenericType, trapSpecificType, and trapEnterprise. Variables are also created for the trap's variable bindings, a list of arbitrary oid-value pairs within the trap packet. These have meaning dependent on the semantics of the trap itself.
2. The variables are placed in a dictionary as pairs, (variable, value). This forms the local binding environment for evaluating the trap rules. This local environment is appended to a pre-existing binding environment formed by the constants present in the MIB referenced by the trap rule.
3. The environment is then scanned for the presence of keysets, i.e., sets of variables gathered from the rules at compile-time. Due to possible fall-through rules, keysets may be subsets of the incoming trap's variables.
4. Each keyset is combined with the values bound in the trap's local environment via a commutative hash key, which allows a rule to be found regardless of the ordering of variable-constant equalities therein. (The use of a commutative hash function eliminates the need for canonically ordering the terms of a rule, a great boost to efficiency in both table lookup and construction.) In the current system, the hash key is 32 bits long, which induces a high probability that the key is unique, thus assuring that the set of rules found on one hash lookup is small.
5. Each keyset produces a set of rules (often just one). These rules are inserted into a balanced tree, ordered by global rule number. This guarantees that the rules will be tested in the order specified by the user.

Variable Names, Oids, and Bindings

At this point, it is important to discuss the variable system employed by SNMP traps. SNMP employs a system of identifiers called object identifiers ("oids"). Oids use a well-known dotted-number notation. Each oid represents a quantity defined in a mib. For example, the sysUpTime variable is represented by the oid 1.3.6.1.2.1.1.3.0.

Oids can be either scalar or indexed. A scalar oid by convention ends in 0.0, and represents a global quantity on the system under measurement (e.g., sysUpTime, above). An indexed oid is one whose root is defined in the MIB, but whose actual instantiation has affixed to it one or more index identifiers, which refer to the particular occurrence of the quantity in the system under measurement. It is similar to accessing a particular cell of an array.

In this description, we refer to a variable (or variable name) as a symbolic entity within the trap rule system. Variables are defined in MIBs, along with their corresponding oids.

An SNMP trap contains an arbitrary number of bindings, each of which is a pair (oid, value). The oid is likely to be indexed, representing a member of a particular set of entities, such as an interface or cpu. Variables referenced in a trap rule map to root oids, i.e., they are unindexed. When we need to find a variable given an oid from an incoming trap, we do so by prefix lookup; an exact match is not possible due to the presence of the index.

Predicates and Keysets

A top-level conjunctive predicate containing variable-constant equalities is said to have a set of keys, consisting of the variables in the equalities. Such a keyset may appear in several rules. Keysets may also be subsets of other keysets, for example, in the presence of fall-through rules. For instance:

trapGenericType=6 & trapEnterprise=acme & trapSpecificType=42 . . . process type 42 for acme
trapGenericType=6 & trapEnterprise=acme & trapSpecificType=57 . . . process type 57 for acme
trapGenericType=6 & trapEnterprise=acme . . . process an unknown type for acme In this case we have two keysets, $k_1$={trapGenericType, trapEnterprise, trapSpecificType} and $k_2$={trapGenericType, trapEnterprise}, where $k_2 \subset k_1$. When such a subset exists, and the constants to which the variables are compared in the intersection are equal, we say that one rule subsumes the other—it covers at least as many incoming traps.

Notice that it is not necessary for a rule to cover all variables in a trap binding in order to match. This is important: it means that we must check the keysets against the variables in the trap, not the other way around. Finding all applicable keysets is an important part of the optimization algorithm.

Algorithm 1: Finding all Applicable Keysets Given a Trap

Figure 17:
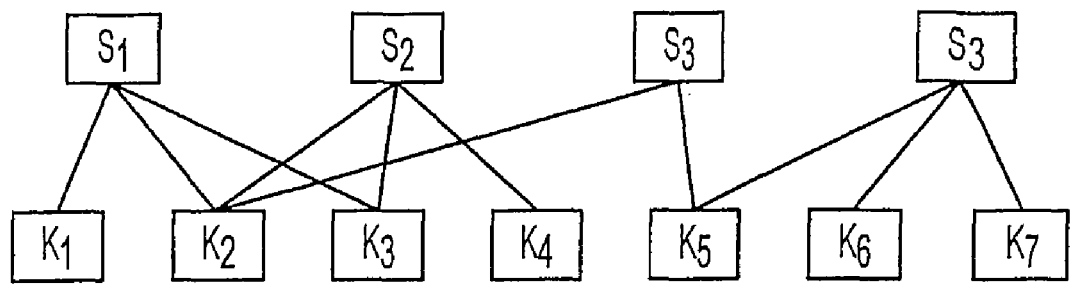
FIG. 17 shows an example of a graph data structure that defines the set of keysets.

Define the set of keysets via a graph data structure, for example, such as that shown in FIG. 17. In that data structure, each s∈S represents a keyset, and each k∈K represents a key. An edge from k to s means "key k is an element of keyset s."

Given an input set of keys I={$i_1, \ldots, i_n$}, determine which keysets are covered by the input, i.e., find the set $$\{P_i(I) | \exists P_j(K), s_m \, P_i(I) = P_j(K) = s_m\},$$

where
$P_i(I)$∈Powerset (I),
$P_j(K)$∈Powerset (K),
$s_m$∈S

The basic idea is to match each input variable i with a key k, and increment a count in s, which is accessible from k by direct pointer reference. At the end of the scan, each s is checked to see if the count matches the cardinality of s, and if so s is deemed a member of the covering sets. As we scan S to determine this, each count field is reset to zero.

```
Types and Methods
    Key
        member-of: list-of-pointer-to-Keyset
    Keyset
        cardinality: integer
        count: integer
Procedure
    findKeySets (I: set of input key names, K: set of all keys Key) returns
result: set of Keyset
    for each i ∈ I
        find a k in K which matches i
        if k found
            for each s ∈ k.member-of
                s.count ← s.count + 1
            end
    end
    for each s ∈ S
        if s.count = s.cardinality
            append s to result          [set notation]
            s.count ← 0
    end
    return result
```

Subsumption

Let p be a predicate applicable across some arbitrary set of variables representing properties of a set of objects assumed to be members of a universe U. Let the function s(p) represent the set, a subset of U, for which p is true.

We take it as axiomatic that:

$$s(p_i \& p_j) = s(p_i) \cap s(p_j)$$

Given two sets A and B, it is well-known that
A∩B ⊂ A and
A∩B ⊆ B

We therefore can easily see that the conjunction $p_i$ & $p_j$ covers a subset of the objects covered by either $p_i$ or $p_j$ alone. When we analyze two rules, we can therefore assess whether one rule covers a superset of the objects covered by another rule. When this occurs, the first rule is said to subsume the second.

Subsumption is common in rule-based systems. Users specify this using ordering: if rules are checked in a certain sequence, then the most-specific rules (fewest matching objects) are placed first, and most-general last. This serves to handle certain cases explicitly and "fall through" to a general handler when no specific rule applies.

Using the analysis above, the software can in many cases inform the user when their prescribed subsumption will not work: if it can be shown by predicate analysis that rule $r_i$ subsumes rule $r_j$, and $i<j$, then the system can warn the user that $r_j$ will never match.

There are cases where subsumption checking is ineffective; in particular, where a conjunction contains predicates which are not analyzable (opaque within the current scope of the optimizer). In this case, the system will not be able to warn the user of potential subsumption problems, and so it is important simply to obey the user's ordering in testing the rules, and thus the optimizer retains that ordering.

Algorithm 2: Rule Lookup

```
Types and Methods
    HashKey     A 32-bit unsigned integer
    HashTable   HashKey → RuleList
    find
    RuleTree    A balanced tree of rules, ordered by global rule number
    insert
    Bindings    Trap variable bindings, Oid → Value
    lookup
    get
    size
    KeySet
Global variables
    t: HashTable      pre-computed hash table (see algorithm 5)
Procedure
    lookupRule (b: Bindings) returns c: RuleTree
    h: HashKey
    k: KeySet
    K: Set of KeySet
    R: set of Rule
    K ← findKeySets (b) (see algorithm 1)
    for each KeySet k ∈ K
        h ← makeHashKey (k, b) (see algorithm 3)
        R ← t.find (h)
        for each Rule r ∈ R
            c.insert (r)
        end
    end
    return c
```

The result is c, a set of rules for evaluation. Often, this will consist of just one rule. The sequence of rules in c is then tested using normal predicate evaluation.

Algorithm 3: Computing a Hash Key

```
makeHashKey (K: KeySet, b: Bindings)
    r: integer       // result
    v: binding value (integer, string, or oid)
    r ← 0
    for each Key k ∈ K
        r ← r ⊕ hash (k)    // ⊕ is addition modulo 2^32
        v ← b.lookup (k)
        r ← r ⊕ hash (v)
    end
    return r
Note that ⊕ is commutative, which satisfies the requirement above.
```

The hash functions for keys and values may be adjusted as desired to provide good distributions. In the current system, simple hash functions are used for all data types. The C code for oid hashing is shown below:

```
unsigned int hashOid (unsigned int oidSubids[ ], unsigned int length)
{
    unsigned int i;
    unsigned int h = 0;
    for (i = 0; i < length; i++)
    {
        h += oidSubids[i];
        if (oidSubids[i] & 1)
            h = ~h;
    }
    return h;
}
```

Building the Hash Table

Construction of the hash table used in lookup is the heart of the optimizer. A conceptual outline of the process is as follows:

1. Scan all predicates for admissible conjunctions, and transform disjunctions into normal form.
2. For each conjunction in variable-constant equality form, compute its hash key using algorithm 3, based on the variable and the compile-time-evaluated constant.

3. Insert the rule using the resulting hash key into the hash table.

Predicate Expression Scanner

The scanner walks an expression tree with the mission of returning a set of bindings representing the variable-constant equalities found in top-level conjunctions. Each binding maps the variable (as represented by its oid) to the constant value. The constant value is determined by compile-time evaluation: if it cannot be evaluated at compile-time, variables will be unbound within the constant expression, and this signals the scanner that it should reject the binding.

An expression walk may return more than one binding in succession, representing the disjunctions encountered. As previously discussed, disjunctions are handled by distributive expansion, which in turn is implemented using a state-based tree walk, which operates as follows.

Figure 18:
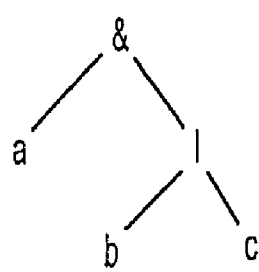
FIG. 18 is the tree form of the expression (a & (b|c)).

Consider the tree form of the expression (a & (b|c)) shown in FIG. 18.

We desire the normal form (a & b|a & c). One way to effect this is to make multiple scans of the tree. Scan once, descending to the left branch of the | (b), then scan again, descending the right branch (c). To do this we must of course remember the last direction taken.

Generalizing this idea to an arbitrary binary expression tree, we see that we can extract each possible combination of | branches, and thus emerge with a set of conjunctions, each of which is a top-level term of a disjunctive-normal-form expression.

To do this we use an analogy to a binary counter. Each disjunction is decorated with a bit, which is possibly flipped on each scan. When the bit transitions to zero, we declare that a carry has occurred use this fact to flip the bit on the next disjunctive node in the tree walk.

The algorithm proceeds in two passes over the expression for each unique conjunction to be returned. The first pass chooses | branches and produces a conjunction. The second pass flips the | choices in binary-counter fashion. When a carry emerges from the pass, we know we have covered all combinations.

Algorithm 4: Predicate Expression Scanner

---

```
Types and Methods
    Expression
        left: Expression
        right: Expression
        type: (&, |, =, other)
        count: Bit, initial value = 0
    State
        carry: Bit
Procedures
    scanExpressionAux is called with an initial State.carry = 1. It is
called successively until it returns with the carry still set to 1, meaning it
has counted through all | expression combinations.
        scanExpression (e: Expression) returns B: list of Bindings
            s: State
            s.carry ← 1
            incrementExpression (e, s)
            while s.carry = 0
                b ← new Bindings   // empty binding environment
                scanExpressionAux (e, b)
                incrementExpression (e, s)
                B.append (b)
            end
            return B
        scanExpressionAux (e: Expression, b: Bindings (out))
            if e is of the form v = k or k = v, evaluate k in the compile-time
                binding environment, and, if the result is defined,
                declare it to be a variable-constant equality and perform
                b.insert (v, eval(k))
            else if e.type = &
```

---

```
                scanExpressionAux (e.left, b)
                scanExpressionAux (e.right, b)
            else if e.type = |
                if a.count = 0
                    scanExpressionAux (e.left, b)
                else if a.count = 1
                    scanExpressionAux (e.right, b)
            else if e.type = other
                nop
        incrementExpression (e: Expression, s: State)
            if e.type = &
                incrementExpression (e.left, s)
                incrementExpression (e.right, s)
            else if e.type = |
                if s.carry = 1
                    e.count ← ¬ e.count
                    if e.count = 0
                        s.carry ←1
                    else
                        s.carry ← 0
            else if e.type = &
                nop
            else if e.type = other
                nop
```

---

Inserting Rules into the Hash Table

With the above algorithms in place, inserting rules into the hash table is now a simple task.

Algorithm 5: Hash Table Insertion

---

```
Types and Methods
    Rule
        predicate: Expression
        action: Action     // not interesting
    RuleList
Global Variables
    R: RuleList
    t: HashTable
    S: set of KeySet       // see algorithm 1
Procedure
    buildHashTable ( )
        for each Rule r ∈ R
            for each Bindings b ∈ scanExpression (r)
                k: set of Variable
                k ← φ
                for each Variable v ∈ b.variables
                    k ← k ∪ {v}
                    varlist ← varlist ∪ {v}
                end
                S ← S ∪ {k}
                h ← makeHashKey (b)
                t.insert (h, r)
            end
        end
```

---

Performance

When the conditions for complete optimization are met (precisely one rule found per hash lookup), the complexity is determined by the number of input variable bindings and the structure of the hash table. The number of input bindings, while in theory of arbitrary size, is in practice limited normally to under ten. The hash table can be structured a priori since the number of rules and the set of hash keys is known at compile-time. In theory, a perfect hash table may be constructed, but in practice this likely has little effect on the overall performance.

If the hash function has good distribution (or a perfect hash is used), and a hash block size is chosen to be large relative to the number of rules, then the hash lookup will be bounded by a constant. Under a similar limiting assumption to the number of bindings, the lookup has complexity $O(1)$.

In practice, the optimizer will not reduce all rules to a single lookup, due to fall-through cases and unanalyzable predicates. However, since all traps key on the basic variables trapGenericType, trapSpecificType, and trapEnterprise, and many proprietary extensions to traps key on simple integer indicators in the trap bindings, we can expect a very large reduction in the number of rules which need to be scanned. We have found that in a set of over 1300 rules covering traps from over 50 vendors and RFCs, the average length of a hash lookup is 3.7, and this is skewed high due to the presence of a pathological set of rules from one vendor containing an unanalyzable predicate which results in several hundred rules in one hash lookup. Most contain just one rule.

The table below displays these measurements. The left column is the number of rules in a hash entry; the right column is the number of such entries found in the table.

| Entry length | Occurrences |
|---|---|
| 1 | 490 |
| 2 | 68 |
| 3 | 18 |
| 4 | 6 |
| 6 | 2 |
| 9 | 1 |
| 738 | 2 |

Informal measurements show that when a single rule is the result of a hash lookup, complete testing of the rule (including hash lookup and subsequent full evaluation of the predicate), takes about 250 μsec on a Sparc 10 processor. Testing 500 rules in sequence would therefore need 125 msec, assuming linear scale (which is best-case). It is clear that even a 10-to-1 reduction in the number of rules tested confers a great savings in rule lookup time.

For a simple common case of rule definition, automatic detection of optimizable predicate expressions leads to a large reduction in lookup time. The advantage for the rule writer is that the performance of rule lookup does not need to be considered when writing rules, making their construction more modular and less like writing a program. Even if one were to endow the rule language with sequential control, as in a programming language, such optimization would still not be possible without using lookup tables and similar devices, thereby increasing the complexity burden on the rule writer.

These ideas can be extended to generalizing the optimizer to more predicate types, and utilizing compile-time partitioning of the rule space to construct small testable rule sets. Some of the predicates which are frequently found in this domain are:

Oid prefix matching. A rule is to be accepted if an incoming value is an oid against which some known prefix must match.

Regular expression matching on strings. An incoming value is a string which must match some known pattern. Such rule predicates are common when matching against events derived from log files, for example.

Bit field extraction. Some trap type encodings involve bit fields within a bound value. The trap matches if the field is equal to some constant.

Analysis of negation. Predicates which use negation on enum sets can be transformed to a positive test on the complement of the enum set with respect to the items to be negated. This can allow us to produce a disjunctive normal form which can then be optimized using the hashing techniques herein described.

It is also interesting to consider how this kind of optimization might be applied to other domains or more general cases. An important result is that, while the general case is very difficult, restricting the optimizer to a domain can make the problem tractable, and can lead to large increases in performance. This is important since most successful rule-based systems are restricted in their domains: not only has optimization proven difficult for the general case, but the semantics has as well.

A number of embodiments of the invention have been described. Nevertheless, it will be understood that various modifications may be made without departing from the spirit and scope of the invention. For example, in the described embodiment, network 13 uses the IP protocol. In alternate embodiments, network 13 could use any one of a number of available protocols such as ATM (Asynchronous Transfer Mode) just to name one.

SNMP traps, which have been the subject of the described embodiment, are only one example of a standard protocol for passing notifications over a network. There are other ways to pass notifications. For example, CMIP, CORBA, TL1, Unix syslog entries, NT event logs, and countless application specific log files are all notifications. The above-described invention is intended to be applicable to any type of event notification system that might be implemented on a computer network.

Accordingly, other embodiments are within the scope of the following claims.

The invention claimed is:

1. A machine-based method for displaying alarm data, comprising:

generating an alarm data table having multiple columns corresponding to different alarm data fields and multiple rows corresponding to different alarms, wherein a primary key associated with the alarm data table includes a subset of the different alarm data fields in the multiple columns that uniquely represent the different alarms in the multiple rows;

removing one or more of the different alarm data fields in the subset of the different alarm data fields from the primary key, wherein removing the one or more alarm data fields from the primary key causes the primary key to non-uniquely represent the different alarms in a plurality of the multiple rows;

collapsing the alarm data table in response to removing the one or more alarm data fields from the primary key, wherein collapsing the alarm data table includes combining the different alarms non-uniquely represented in the plurality of the multiple rows into one combined row that uniquely represents the different alarms in the plurality of the multiple rows; and rendering the collapsed alarm data table with the one combined row replacing the plurality of the multiple rows.

2. The method of claim 1, wherein rendering the collapsed alarm data table includes displaying wildcard symbols in one or more cells associated with the one or more alarm data fields removed from the primary key.

3. The method of claim 1, wherein rendering the collapsed alarm data table includes displaying a maximum severity associated with the different alarms uniquely represented in the one combined row in one or more cells associated with the one combined row.

4. The method of claim 1, wherein the one or more alarm data fields are removed from the primary key in response to an input that selects the one or more alarm data fields.

5. The method of claim 1, further comprising summing a count associated with the different alarms uniquely represented in the one combined row, wherein rendering the collapsed alarm data table further includes displaying the summed count in one or more cells associated with the one combined row.

6. A machine-based system for displaying alarm data, wherein the system comprises one or more processors configured to:
- generate an alarm data table having multiple columns corresponding to different alarm data fields and multiple rows corresponding to different alarms, wherein a primary key associated with the alarm data table includes a subset of the different alarm data fields in the multiple columns that uniquely represent the different alarms in the multiple rows;
- remove one or more of the different alarm data fields in the subset of the different alarm data fields from the primary key, wherein the primary key with the one or more alarm data fields removed therefrom causes a plurality of the multiple rows in the alarm data table to non-uniquely represent the different alarms in the plurality of the multiple rows;
- collapse the alarm data table with the one or more alarm data fields removed from the primary key, wherein the collapsed alarm data table combines the different alarms non-uniquely represented in the plurality of the multiple rows into one combined row that uniquely represents the different alarms in the plurality of the multiple rows; and
- render the collapsed alarm data table with the one combined row replacing the plurality of the multiple rows.

7. The system of claim 6, wherein the one or more processors are further configured to render the collapsed alarm data table with wildcard symbols displayed in one or more cells associated with the one or more alarm data fields removed from the primary key.

8. The system of claim 6, wherein the one or more processors are further configured to display the collapsed alarm data table with a maximum severity associated with the different alarms uniquely represented in the one combined row in one or more cells associated with the one combined row.

9. The system of claim 6, wherein the one or more processors are configured to remove the one or more alarm data fields from the primary key in response to an input that selects the one or more alarm data fields.

10. The system of claim 6, wherein the one or more processors are further configured to sum a count associated with the different alarms uniquely represented in the one combined row and render the collapsed alarm data table with the summed count displayed in one or more cells associated with the one combined row.

11. A machine-based system for displaying alarm data, comprising: one or more processors configured to: execute an exception engine to generate an alarm data table having multiple columns corresponding to different alarm data fields and multiple rows corresponding to different alarms, wherein a primary key associated with the alarm data table includes a subset of the different alarm data fields in the multiple columns that uniquely represent the different alarms in the multiple rows;
- execute an exception browser to remove one or more of the different alarm data fields in the subset of the different alarm data fields from the primary key, wherein the primary key with the one or more alarm data fields removed therefrom causes a plurality of the multiple rows in the alarm data table to non-uniquely represent the different alarms in the plurality of the multiple rows; and
- execute the exception browser to collapse the alarm data table with the one or more alarm data fields removed from the primary key, wherein the collapsed alarm data table combines the different alarms non-uniquely represented in the plurality of the multiple rows into one combined row that uniquely represents the different alarms in the plurality of the multiple rows; and
- a display device configured to render the collapsed alarm data table with the one combined row replacing the plurality of the multiple rows.

12. The system of claim 11, wherein the display device is configured to render the collapsed alarm data table with wildcard symbols displayed in one or more cells associated with the one or more alarm data fields removed from the primary key.

13. The system of claim 11, wherein the display device is configured to render the collapsed alarm data table with a maximum severity associated with the different alarms uniquely represented in the one combined row in one or more cells associated with the one combined row.

14. The system of claim 11, wherein the one or more processors are configured to execute the exception browser to remove the one or more alarm data fields from the primary key in response to an input that selects the one or more alarm data fields.

15. The system of claim 11, wherein the display device is configured to render the collapsed alarm data table with a summed count associated with the different alarms uniquely represented in the one combined row in one or more cells associated with the one combined row.

* * * * *